US008650512B1

(12) United States Patent
Daubenspeck et al.

(10) Patent No.: US 8,650,512 B1
(45) Date of Patent: *Feb. 11, 2014

(54) ELASTIC MODULUS MAPPING OF AN INTEGRATED CIRCUIT CHIP IN A CHIP/DEVICE PACKAGE

(71) Applicant: International Business Machines Corporation, Armonk, NY (US)

(72) Inventors: Timothy H. Daubenspeck, Colchester, VT (US); Mark C. H. Lamorey, South Burlington, VT (US); Xiao Hu Liu, Briarcliff Manor, NY (US); Thomas M. Shaw, Peekskill, NY (US); Thomas A. Wassick, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/677,373

(22) Filed: Nov. 15, 2012

(51) Int. Cl.
*G06F 17/50* (2006.01)

(52) U.S. Cl.
CPC ........ *G06F 17/5081* (2013.01); *G06F 17/5072* (2013.01); *G06F 2217/12* (2013.01); *G06F 2217/14* (2013.01); *G06F 2217/38* (2013.01); *G06F 2217/40* (2013.01)
USPC ............... 716/55; 716/54; 716/111; 716/123; 716/136; 703/14

(58) Field of Classification Search
CPC ............ G06F 17/5081; G06F 17/5072; G06F 2217/12; G06F 2217/14; G06F 2217/38; G06F 2217/40
USPC .................. 716/55, 54, 111, 123, 136; 703/14
See application file for complete search history.

(56) References Cited

U.S. PATENT DOCUMENTS

| 3,871,015 A | 3/1975 | Lin et al. |
| 5,270,571 A | 12/1993 | Parks et al. |

(Continued)

FOREIGN PATENT DOCUMENTS

| JP | 11330010 A | * 11/1999 | ............. H01L 21/56 |
| JP | 2000-269270 A | 9/2000 | |

(Continued)

OTHER PUBLICATIONS

Cui J et al., Chinese Patent Document No. CN 101872784 A, published Oct. 27, 2010, 3 pages (front page and drawing only).*

(Continued)

*Primary Examiner* — Phallaka Kik
(74) *Attorney, Agent, or Firm* — Gibb & Riley, LLC; David A. Cain, Esq.

(57) ABSTRACT

Computer-implemented methods are disclosed for providing an elastic modulus map of an integrated circuit (IC) chip of a chip/device package, for identifying a probable failure site of the chip/device package from the elastic modulus map of the IC chip, for modifying a connector footprint of the chip/device package based on identifying a probable failure site from the elastic modulus map of the IC chip, and for modifying the IC chip based on identifying a probable failure from the elastic modulus map of the IC chip. Each layer of the IC chip may be mapped, and each grid shape of the mapped layers may comprise a metal area and a dielectric area. Grid shapes from each layer of the IC are vertically aligned to provide a combined spring constant for each grid shape, which are then mapped onto the elastic modulus map to identify possible failure sites in the chip/device package.

23 Claims, 12 Drawing Sheets

(56) References Cited

U.S. PATENT DOCUMENTS

| | | |
|---|---|---|
| 5,600,541 A | 2/1997 | Bone et al. |
| 5,953,814 A | 9/1999 | Sozansky et al. |
| 6,229,209 B1 | 5/2001 | Nakamura et al. |
| 6,365,499 B1 | 4/2002 | Nakamura et al. |
| 6,399,896 B1 | 6/2002 | Downes, Jr. et al. |
| 6,480,996 B1* | 11/2002 | Aji et al. ............... 716/129 |
| 6,613,449 B2 | 9/2003 | Yamaguchi et al. |
| 6,624,004 B2 | 9/2003 | Lee |
| 6,630,837 B2 | 10/2003 | Wark |
| 6,717,255 B2 | 4/2004 | Oggioni et al. |
| 6,883,153 B2 | 4/2005 | Jiang et al. |
| 6,981,230 B1* | 12/2005 | Lin et al. ............... 716/115 |
| 7,180,183 B2 | 2/2007 | Tsai et al. |
| 7,387,910 B2 | 6/2008 | Lee et al. |
| 7,456,047 B2 | 11/2008 | Mallik et al. |
| 7,543,254 B2* | 6/2009 | Xu et al. ............... 716/136 |
| 7,670,876 B2 | 3/2010 | Tsai |
| 7,752,581 B2 | 7/2010 | Lanzerotti et al. |
| 7,802,220 B1* | 9/2010 | Popovich et al. ......... 716/120 |
| 7,805,258 B2 | 9/2010 | Fu et al. |
| 7,892,962 B2 | 2/2011 | Su |
| 7,937,674 B2 | 5/2011 | White et al. |
| 7,952,199 B2 | 5/2011 | Jo et al. |
| 8,039,971 B2 | 10/2011 | Hosseini et al. |
| 8,214,773 B2* | 7/2012 | Lu et al. ............... 716/54 |
| 8,399,996 B2 | 3/2013 | Hosseini et al. |
| 8,479,141 B1* | 7/2013 | Waller et al. ............ 716/126 |
| 2002/0042902 A1* | 4/2002 | Yamamoto et al. ........ 716/1 |
| 2003/0083856 A1* | 5/2003 | Yoshimura et al. ........ 703/18 |
| 2004/0025126 A1 | 2/2004 | Culler et al. |
| 2007/0186206 A1* | 8/2007 | Abrams et al. .......... 716/19 |
| 2007/0244676 A1* | 10/2007 | Shang et al. ........... 703/2 |
| 2008/0054455 A1 | 3/2008 | Tsao et al. |
| 2008/0066023 A1* | 3/2008 | Xu et al. .............. 716/4 |
| 2008/0315413 A1 | 12/2008 | Yamano et al. |
| 2009/0044162 A1* | 2/2009 | Yoshioka ............... 716/8 |
| 2009/0075429 A1 | 3/2009 | Sato et al. |
| 2009/0083356 A1* | 3/2009 | Welkie ................. 708/443 |
| 2010/0006987 A1* | 1/2010 | Murugan et al. ......... 257/659 |
| 2010/0022085 A1* | 1/2010 | Goebel et al. .......... 438/637 |
| 2010/0205577 A1* | 8/2010 | Lu et al. .............. 716/21 |
| 2010/0243299 A1 | 9/2010 | Kariya et al. |
| 2011/0145772 A1 | 6/2011 | Pikus |
| 2011/0151627 A1 | 6/2011 | Graf et al. |
| 2011/0185326 A1 | 7/2011 | Ueda et al. |
| 2012/0036491 A1* | 2/2012 | Ramji et al. ........... 716/122 |
| 2012/0212375 A1* | 8/2012 | Depree, IV ............ 343/700 MS |
| 2012/0290996 A1* | 11/2012 | Law et al. ............. 716/127 |
| 2013/0075869 A1* | 3/2013 | Mackh et al. ........... 257/620 |

FOREIGN PATENT DOCUMENTS

| | | |
|---|---|---|
| JP | 2006-237470 | 9/2006 |
| JP | 2007-199961 A | 8/2007 |

OTHER PUBLICATIONS

Gadag, et al., "Numerical Prediction of Mechanical Properties of Pb-Sn Solder Alloys Containing Antimony, Bismuth and or Silver Ternary Trace Elements," Journal of Electronic Materials, vol. 29, No. 12, Dec. 2000, pp. 1392-1397.

Ernst, et al., "On the Effect of Cure-Residual Stress on Flip Chip Failure Prediction," Electronics Packaging Technology Conference, 2002, pp. 398-403.

Zhao, et al., "Prediction of Die Failure in copper-low-k Flip Chip Package with Consideration of Packaging Process-Induced Stresses," International Conference on Electronic Packaging Technology & High Density Packaging (ICEPT-HDP), 2009, pp. 322-326.

Rahim, et al., "Fundamentals of Delamination Initiation and Growth in Flip Chip Assemblies," 2005 Electronic Components and Technology Conference, IEEE 2005, pp. 1172-1186.

Alcoe, et al., "A High Performance, Low Stress, Laminate Ball Grid Array Flip Chip Carrier," Semiconductor Packaging Technologies Symposium, SEMICON West 99, 1999, pp. 1-13.

U.S. Appl. No. 13/557,386, filed Jul. 25, 2012, Office Action Communication, Jul. 10, 2013, 4 pages.

U.S. Appl. No. 13/557,386, filed Jul. 25, 2012, Notice of Allowance Communication, Aug. 14, 2013, 16 pages.

* cited by examiner

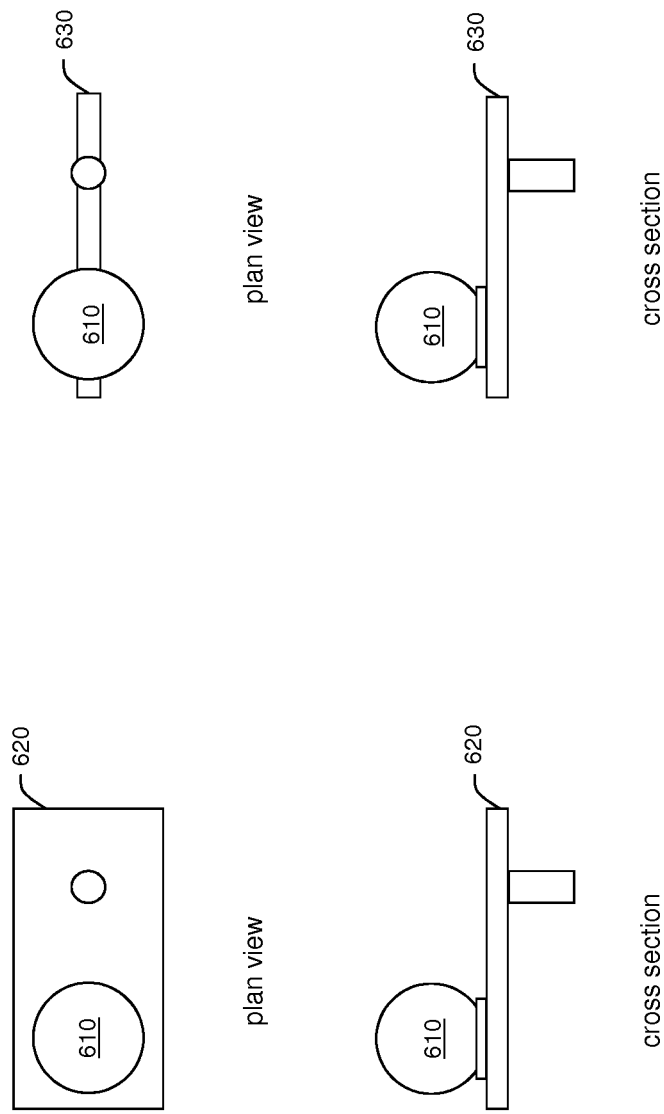

ELASTIC MODULUS MAPPING OF AN INTEGRATED CIRCUIT CHIP IN A CHIP/DEVICE PACKAGE

CROSS REFERENCE TO RELATED APPLICATION

The present patent application is related to a non-provisional patent application, which is commonly assigned, presently pending and entitled, "Elastic Modulus Mapping of a Chip Carrier in a Flip Chip Package", filed on Jul. 25, 2012, receiving U.S. patent application Ser. No. 13/557,386, the entire teachings of which are incorporated herein by reference.

BACKGROUND

1. Field of Invention

The disclosure generally relates to chip package interactions (CPIs) between an integrated circuit (IC) chip, a multilayer electronic device, and a connector footprint interposed between the IC chip and the multilayer electronic device in a chip/device package. More particularly, the disclosure relates to providing an elastic modulus map of the IC chip, based on stacked elastic modulus maps of each back-end-of-line (BEOL) layer of the IC chip, that identifies probable mechanical failure sites during chip-join and cool-down of the chip/device package.

2. Description of Related Art

The semiconductor marketplace continues to demand smaller devices, which require greater connectivity densities for packaging design. The increased functionality of smaller semiconductor devices requires an increased number of signal, power and ground connections, and a corresponding decrease in connection pitch is required to maintain reasonable chip size. The combination of these requirements results in greater complexity of semiconductor packaging design.

Referring to FIG. 1, the packaging design requirement is especially critical in a flip chip package 100, i.e., a "flipped" IC chip 110 connected to a chip carrier 120 by interposed connectors of a connector footprint. The connectors 130 can comprise one of solder bumps and copper (Cu) pillars. The connectors connect various signal, power and ground terminals from a final wiring level of the IC chip 110 to corresponding signal, power and ground terminals on the chip carrier 120 of the flip chip package 100. The flip chip package 100 provides significant numbers of signal, power and ground connections from the flipped IC chip 110 of FIG. 1, through solder bumps or Cu pillars 130 to a chip carrier 120. The solder bumps or Cu pillars 130 are formed on ball limiting metallurgy (BLM) structures 150, which are, in turn, formed on an outer surface of the flipped IC chip 110. During chip-join and cool-down, the solder bumps or Cu pillars 130 form electrical and connections with flip chip (FC) pads 140 formed on a top surface of the chip carrier 120. In turn, the FC pads 140 electrically connect through various pathways of the chip carrier 120 to, for example, a ball grid array, or lands/solder balls that connect to a system board.

FIG. 2 illustrates a cross section of an IC chip 200 that includes metallization scheme levels, 250-230. A connector 270 is formed on BLM structure 265, which penetrates passivation layer 260 of the IC chip 200 to make electrical contact with a metal fill, UB, in a topmost metallization layer or back-end-of-line (BEOL) layer of metallization scheme level, 250. Each BEOL layer can comprise one or more design elements, i.e., areas of any of metal fills, metal lines or metal vias, and areas of a dielectric that separate the design elements. For example, referring to FIG. 2, the BEOL layer containing the metal fill, UB, also contains the coplanar dielectric material, tetraethyl orthosilicate (TEOS), which surrounds the metal fill. Each BEOL layer provides voltage planes and/or ground planes that can form portions of passive electrical devices or can redistribute various voltages and signals. The metal fills, metal lines and metal vias are frequently separated from the surrounding dielectric material by a liner.

Generally, metal vias are made by filling a via-hole in the dielectric material of a metallization layer with a liner material, drilling a hole in the liner material, and filling the hole with metal. The metal of metal via, VB, for example, is prevented from diffusing into the dielectric material of the coplanar BEOL layer by the liner material. The metal via, VB, can contact the metal fill, UB, of an overlying BEOL layer, and a metal fill, UA, of an underlying BEOL layer, to provide an electrical connection between an overlying BEOL layer and an underlying BEOL layer. In general, a metal vias electrically connect the active devices of the silicon layers 210 of the IC chip to the appropriate ground planes, voltage planes, signal traces, or passive devices of the BEOL layers of the metallization scheme levels 230-250 for operation and testing of the IC chip 200.

Additionally, FIG. 2 illustrates that metallization scheme levels 230-250 and their BEOL layers can comprise various dielectric materials, e.g., tetraethyl orthosilicate (TEOS), any of various ultra low k dielectric materials, and any of various SiOC:H dielectric films prepared from octamethylcyclo-tetrasiloxane (OMCTS). Furthermore, the dielectric materials of any of the metallization scheme levels 250-230 can be graded to yield corresponding graded physical properties.

Referring to FIG. 2, the feature size of design elements, e.g., a metal fill, a metal line or a metal via, of the BEOL layers in each of the metallization scheme levels 250-230 decreases from topmost metallization scheme level 250 to bottom most metallization scheme level 230 of the IC chip 200. That is, the height and the lateral extent of the design elements decrease from the topmost metallization scheme level 250 to the bottom most metallization scheme level 230 overlying the IC chip 200.

The mechanical stresses and strains that occur with chip package interactions (CPIs) are complex, depending upon many factors including IC chip design, process variations in IC chip manufacture, design of a multilayer electronic device to which the IC chip is connected, process variations in the multilayer electronic device's manufacture and process variations in bond and assembly of the chip/device package. Many CPIs result from stress/strain caused by a mismatch between the coefficients of thermal expansion (CTE) of the IC chip and the multilayer electronic device, e.g., another IC chip or a chip carrier, during the heating and cooling of the chip/device package to join the IC chip and the multilayer electronic device. Differences in contraction during chip-join and cool-down result in shear forces between the IC chip and the multilayer electronic device. These shear forces are usually propagated as stress/strain through the connectors, e.g., solder bumps or Cu pillars, to an interface region of the connector with the IC chip.

One type of chip package interaction (CPI) is a so-called "white bump", i.e., a white area on a photographically processed acoustic image, used for testing, that is coextensive with a solder bump. Each white bump corresponds to the location of a material fracture, i.e., a test failure, in the interface region between the solder bump and the IC chip. Frequently, the white bump resembles a divot formed beneath the solder bump in the BEOL layers of the IC chip. White bumps typically occur during chip-join and cool-down, or during subsequent handling of the chip/device package before an underfill is introduced between the IC chip and the multilayer electronic device to more uniformly distribute stresses across the IC chip/multilayer electronic device interface.

White bumps are more likely to occur at sites associated with a greater shear force and/or a greater stiffness of materials. Mechanical analysis indicates that the shear forces propagated by a connector on the IC chip are proportional to a radial distance from a central neutral point on the IC chip, i.e., a point that does not move with either thermal expansion or contraction of the IC chip. The elastic modulus (Young's modulus) or stiffness of areas of the IC chip that underlie the connectors, depend on the stiffness of corresponding areas of each of the underlying BEOL layers comprising the areas of the IC chip. Each BEOL layer, when viewed in a top plan view, can vary in stiffness across its area, depending on the location of design elements, e.g., metal fills, metal lines and metal vias, disposed within each BEOL layer.

There remains a need for a method to identify those design elements of back-end-of-line (BEOL) layers of an IC chip of a chip/device package that may contribute to possible "white bump" failures in the chip/device package, based on elastic modulus mappings of the design elements disposed within each of the BEOL layers of the IC chip, and to modify these design elements to decrease the probability of such "white bump" failures.

SUMMARY

In view of the foregoing, an exemplary embodiment of the disclosure may provide a computer-implemented method for providing an elastic modulus map of an integrated circuit (IC) chip of a chip/device package. The method may include loading design data for the IC chip that includes x, y, z coordinates of design elements within each back-end-of line (BEOL) layer of a plurality of BEOL layers, where the design elements may comprise any of a metal fill, a metal line, and a metal via, and dielectric juxtaposed to the design elements. The method may also include mapping one of a plurality of uniform tessellated grids onto each of the BEOL layers, where each of the plurality of uniform tessellated grids may comprise shapes related to feature sizes of the design elements in each of the BEOL layers and where the shapes of each of the uniform tessellated grids and the feature sizes of the design elements may decrease from a topmost BEOL layer to a bottom most BEOL layer. The method may also include determining a metal area and a dielectric area for each of the shapes of each of the plurality of uniform tessellated grids for each of the BEOL layers, based on the design data for any portion of any of the design elements in each of the shapes. The method may further include determining for each of the shapes of each one of the uniform tessellated grids for each of the BEOL layers, an equivalent spring constant related to a first spring constant based on the metal area, a first elastic modulus of the metal, and a metal thickness from the design data, and a second spring constant based on the dielectric area, a second elastic modulus of the dielectric material, and a dielectric thickness from the design data. The method may yet further include accumulating each equivalent spring constant from each of the shapes of each of the uniform tessellated grids for each of the BEOL layers of the IC chip that is located beneath a shape of a topmost uniform tessellated grid, to provide a combined spring constant for each of the shapes of the topmost uniform tessellated grid. Finally, the method may include mapping each of the combined spring constants from each of the shapes of the topmost uniform tessellated grid to provide the elastic modulus map of the IC chip of the chip/device package.

Another exemplary embodiment of the disclosure may provide a computer-implemented method for identifying a probable failure site of a chip/device package from an elastic modulus map of an integrated circuit (IC) chip of the chip/device package. The method may include loading design data for the chip/device package that includes x, y, z coordinates of design elements within each back-end-of line (BEOL) layer of a plurality of BEOL layers of the IC chip and an x, y coordinates for each connector from a connector footprint of the chip/device package. The design elements may comprise any of a metal fill, a metal line, and a metal via, and dielectric juxtaposed to the design elements. The method may also include determining a first distance of each connector to a neutral point on a surface of the IC chip and a second distance from each connector to an edge of the surface of the IC chip, assigning a location score to each connector based on the first distance and the second distance, and identifying each connector that exceeds a threshold location score with a probable failure site of the chip/device package in the design data. The method may further include mapping one of a plurality of uniform tessellated grids onto each of the BEOL layers, where each of the uniform tessellated grids may comprise shapes that are related to feature sizes of the design elements in each of the BEOL layers, and where the shapes of each of the uniform tessellated grids and the feature sizes of the design elements may decrease from a topmost BEOL layer to a bottom most BEOL layer. The method may yet further include determining a metal area and a dielectric area for each of the shapes of each of the uniform tessellated grids for each of the BEOL layers, based on the design data for any portion of any of the design elements located in each of the shapes. The method may yet further include determining for each of the shapes of each one of the uniform tessellated grids for each of the BEOL layers, an equivalent spring constant related to a first spring constant based on the metal area, a first elastic modulus of the metal, and a metal thickness from the design data, and a second spring constant based on the dielectric area, a second elastic modulus of the dielectric material, and a dielectric thickness from the design data. The method may yet further include accumulating each equivalent spring constant from each of the shapes of each of the uniform tessellated grids for each of the BEOL layers of the IC chip that is located beneath each connector, to provide a combined spring constant for each of the shapes of a topmost uniform tessellated grid located beneath each connector. Finally, the method may include mapping each of the combined spring constants from each of the shapes of the topmost uniform tessellated grid located beneath each connector to provide the elastic modulus map of the IC chip of the chip/device package, and identifying each connector that exceeds a threshold combined spring constant in the elastic modulus map with a probable failure site of the chip/device package in the design data.

Yet another exemplary embodiment of the disclosure may provide a computer-implemented method for modifying a connector footprint of a chip/device package, based on identifying a probable failure site of the chip/device package from an elastic modulus map of an integrated circuit (IC) chip of the chip/device package. The method may include loading design data for the chip/device package that includes x, y, z coordinates of design elements within each back-end-of line (BEOL) layer of a plurality of BEOL layers of the IC chip and an x, y coordinates for each connector from a connector footprint of the chip/device package. The design elements may comprise any of a metal fill, a metal line, and a metal via, and dielectric juxtaposed to the design elements. The method may also include determining a first distance of each connector to a neutral point on a surface of the IC chip and a second distance from each connector to an edge of the surface of the IC chip, assigning a location score to each connector based on the first distance and the second distance, and identifying each connector that exceeds a threshold location score with a probable failure site of the chip/device package in the design data. The method may further include mapping one of a plurality of uniform tessellated grids onto each of the BEOL layers, where each of the uniform tessellated grids may comprise shapes that are related to feature sizes of the design elements in each of the BEOL layers, and where the shapes of each of the uniform tessellated grids and the feature sizes of the design elements may decrease from a topmost BEOL layer to a bottom most BEOL layer. The method may yet further include determining a metal area and a dielectric area for each of the shapes of each of the uniform tessellated grids for each of the BEOL layers, based on the design data for any portion of any of the design elements located in each of the shapes. The method may yet further include determining for each of the shapes of each one of the uniform tessellated grids for each of the BEOL layers, an equivalent spring constant related to a first spring constant based on the metal area, a first elastic modulus of the metal, and a metal thickness from the design data, and a second spring constant based on the dielectric area, a second elastic modulus of the dielectric material, and a dielectric thickness from the design data. The method may yet further include accumulating each equivalent spring constant from each of the shapes of each of the uniform tessellated grids for each of the BEOL layers of the IC chip that is located beneath each connector, to provide a combined spring constant for each of the shapes of a topmost uniform tessellated grid located beneath each connector. The method may yet further include mapping each of the combined spring constants from each of the shapes of the topmost uniform tessellated grid located beneath each connector to provide the elastic modulus map of the IC chip of the chip/device package, and identifying each connector located above a shape of the topmost uniform tessellated grid that exceeds a threshold combined spring constant in the elastic modulus map with a probable failure site of the chip/device package in the design data. For each connector identified as a probable failure site of the chip/device in the design data, the method may finally include identifying an adjacent connector site that lacks a connector from the connector footprint of the chip/device package, and adding a new connector to the adjacent connector site, to reduce shear forces propagated into the probable failure site.

Yet another exemplary embodiment of the disclosure may provide a computer-implemented method for modifying an integrated circuit (IC) chip of a chip/device package, based on identifying a probable failure site of the chip/device package from an elastic modulus map the IC chip. The method may include loading design data for the chip/device package that includes x, y, z coordinates of design elements within each back-end-of line (BEOL) layer of a plurality of BEOL layers of the IC chip and an x, y coordinates for each connector from a connector footprint of the chip/device package. The design elements may comprise any of a metal fill, a metal line, and a metal via, and dielectric juxtaposed to the design elements. The method may also include determining a first distance of each connector to a neutral point on a surface of the IC chip and a second distance from each connector to an edge of the surface of the IC chip, assigning a location score to each connector based on the first distance and the second distance, and identifying each connector that exceeds a threshold location score with a probable failure site of the chip/device package in the design data. The method may further include mapping one of a plurality of uniform tessellated grids onto each of the BEOL layers, where each of the uniform tessellated grids may comprise shapes that are related to feature sizes of the design elements in each of the BEOL layers, and where the shapes of each of the uniform tessellated grids and the feature sizes of the design elements may decrease from a topmost BEOL layer to a bottom most BEOL layer. The method may yet further include determining a metal area and a dielectric area for each of the shapes of each of the uniform tessellated grids for each of the BEOL layers, based on the design data for any portion of any of the design elements located in each of the shapes. The method may yet further include determining for each of the shapes of each one of the uniform tessellated grids for each of the BEOL layers, an equivalent spring constant related to a first spring constant based on the metal area, a first elastic modulus of the metal, and a metal thickness from the design data, and a second spring constant based on the dielectric area, a second elastic modulus of the dielectric material, and a dielectric thickness from the design data. The method may yet further include accumulating each equivalent spring constant from each of the shapes of each of the uniform tessellated grids for each of the BEOL layers of the IC chip that is located beneath each connector, to provide a combined spring constant for each of the shapes of a topmost uniform tessellated grid located beneath each connector. The method may yet further include mapping each of the combined spring constants from each of the shapes of the topmost uniform tessellated grid located beneath each connector to provide the elastic modulus map of the IC chip of the chip/device package, and identifying each connector located above a shape of the topmost uniform tessellated grid that exceeds a threshold combined spring constant in the elastic modulus map with a probable failure site of the chip/device package in the design data. For at least one shape of the topmost uniform tessellated grid that exceeds the threshold combined spring constant in the elastic modulus map, the method may finally include modifying a metal area of a design element from at least one of the shapes in at least one of the plurality of uniform tessellated grids for each of the BEOL layers of the IC chip, which underlies the at least one shape of the topmost uniform tessellated grid, to decrease a value of the combined spring constant for the at least one shape in the elastic modulus map and reduce an elastic modulus value for the at least one shape.

BRIEF DESCRIPTION OF THE DRAWINGS

Exemplary embodiments of the disclosures herein will be better understood from the following detailed description with reference to the drawings, which are not necessarily drawn to scale and in which:

FIG. 6A illustrates a top plan view and a cross section of a connector overlying a metal fill of a BEOL layer in an IC chip in an exemplary embodiment;

FIG. 6B illustrates a top plan view and a cross section of a connector overlying a metal wire in a BEOL layer of an IC chip in an exemplary embodiment;

DETAILED DESCRIPTION

Figure 1:
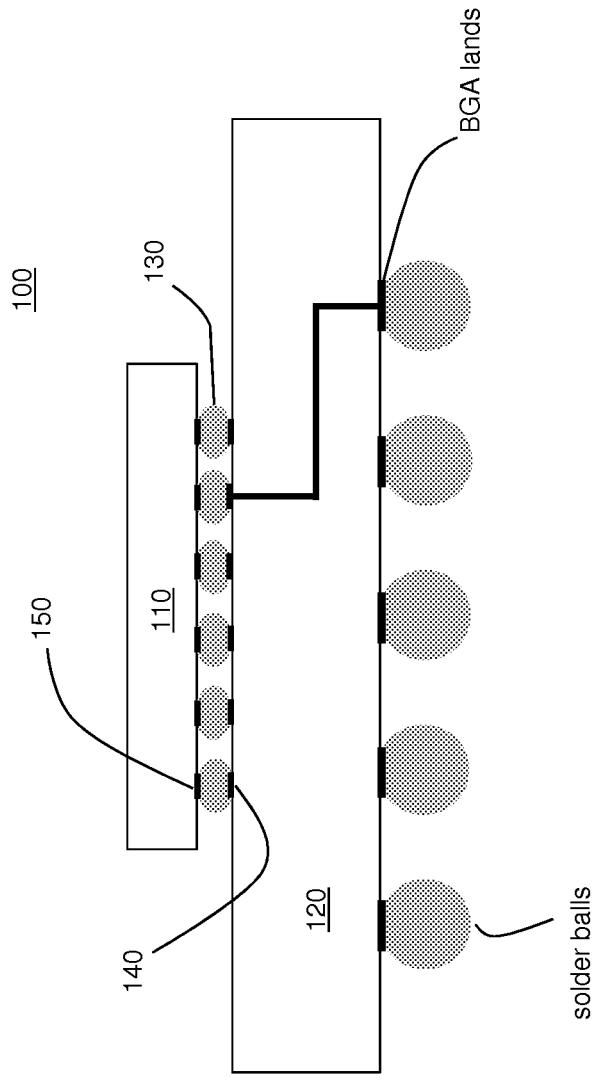
FIG. 1 is a schematic diagram illustrating a cross section of a flip chip package in the related art.
Figure 2:
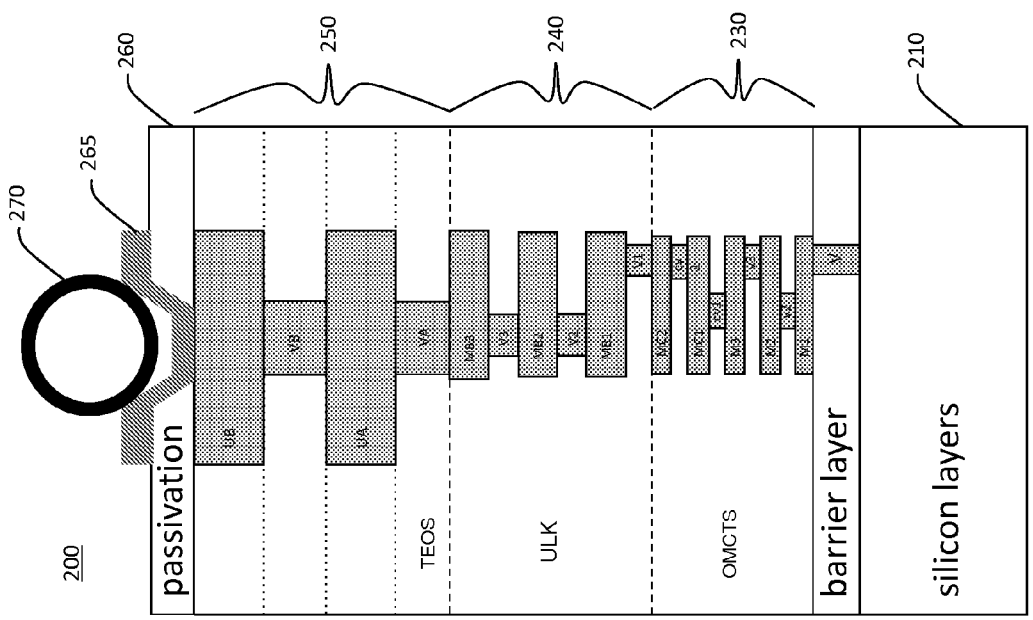
FIG. 2 is a schematic diagram illustrating a cross section of an electrical connection, a ball limiting metallurgy (BLM) structure, and back-end-of-line (BEOL) layers of an integrated circuit (IC) chip used in a flip chip package in the related art.

The exemplary embodiments of the disclosure and their various features and advantageous details are explained more fully with reference to the non-limiting exemplary embodiments that are illustrated in the accompanying drawings and detailed in the following description. It should be noted that the features illustrated in the drawings are not necessarily drawn to scale. Descriptions of well-known materials, components, and processing techniques are omitted so as to not unnecessarily obscure the exemplary embodiments of the disclosure. The examples are intended to merely facilitate an understanding of ways in which the exemplary embodiments of the disclosure may be practiced and to further enable those of skill in the art to practice the exemplary embodiments. Accordingly, the examples should not be construed as limiting the scope of the exemplary embodiments of the disclosure.

As described above, there remains a need for a method to identify those design elements of back-end-of-line (BEOL) layers of an IC chip of a chip/device package that may contribute to possible "white bump" failures in the chip/device package, based on elastic modulus mappings of the design elements disposed within each of the BEOL layers of the IC chip, and to modify these design elements to decrease the probability of such "white bump" failures.

White bumps are more likely to occur when greater shear forces are propagated through a connector, e.g., one of a solder bump and a copper (Cu) pillar, from a multilayer electronic device, e.g., one of a second IC chip and a chip carrier, of a chip/device package to an interface region between the connector and the IC chip during chip-join and cool-down. The interface region may include a ball limiting metallurgy (BLM) structure formed on a top surface of the IC chip and the BEOL layers of the IC chip. Each of the BEOL layers may include: any of the design elements of metal fills, metal lines and metal vias, and the areas of dielectric material that separates the design elements within each BEOL layer. The stiffness of the IC chip and thus, its association with a probable failure site, i.e., a white bump, may relate to the elastic modulus (Young's modulus) of areas of a BEOL layer, in which each area may contain areas of design elements having an elastic modulus characteristic of a metal and areas of a dielectric having another elastic modulus characteristic of the dielectric material. The shear forces propagated through the connectors from a multilayer electronic device to the interface region of the IC chip during cooling may be proportional to a radial distance of each of the connectors from a centrally located neutral point on the surface of the IC chip, i.e., the DNP. A connector footprint of the chip/device package design may map those connector sites on a BEOL layer of the IC chip where a connector is to be formed.

In a plan view, a uniform tessellated grid may be mapped onto x, y coordinates of each of the BEOL layers of the IC chip in an exemplary embodiment. The uniform tessellated shapes that cover the plane surface of each of the BEOL layers may comprise any one of squares, triangles, rectangles, and hexagons. Each BEOL layer may vary in stiffness across the uniform shapes of the grid, depending on the location of any design elements, e.g., metal fills, metal lines, and metal vias, and the dielectric. The x, y coordinates of any of the design elements located in each grid shape of each BEOL layer may be provided by the software layout of the IC chip design. Likewise, the thickness of any design element in a BEOL layer may be provided by the z coordinate of the BEOL layer from the IC chip design.

Figure 3B:
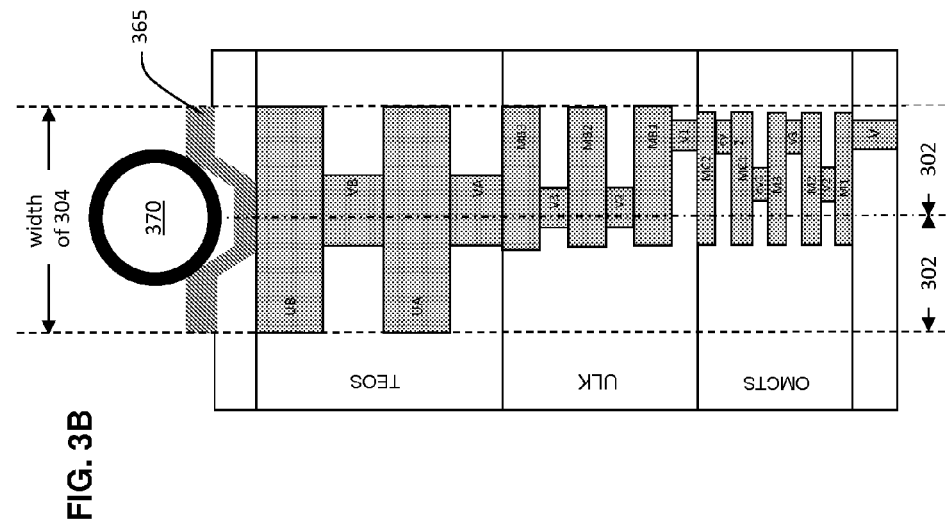
FIG. 3B illustrates a cross section of a connector, a BLM structure, and BEOL layers of an IC chip upon which the uniform tessellated grid of square shapes has been mapped in an exemplary embodiment.
Figure 3A:
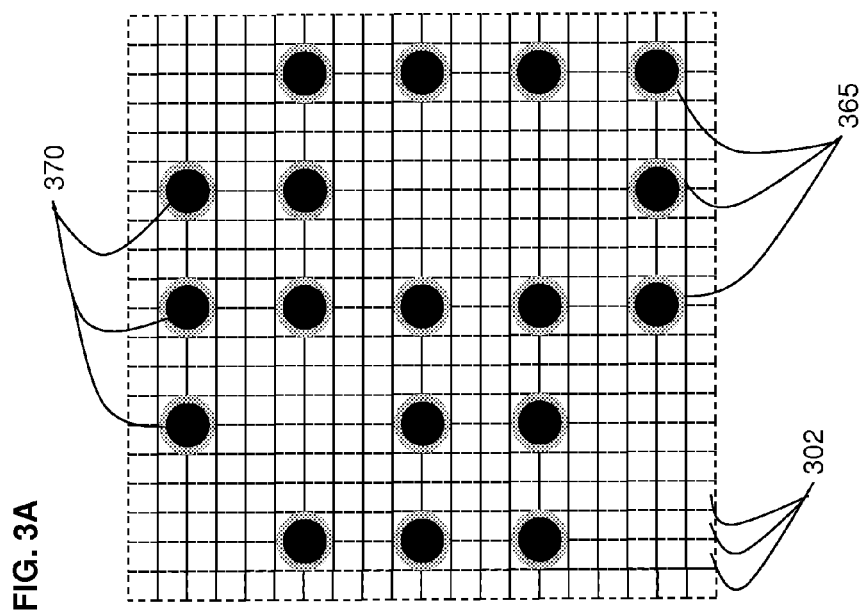
FIG. 3A illustrates a top plan view of connectors located on a uniform tessellated grid of square shapes of a topmost BEOL layer of an IC chip in an exemplary embodiment.

FIG. 3A illustrates a top plan view of a plurality of connectors 370 of a connector footprint of the IC chip that is mapped onto a topmost surface of the IC chip according to, for example, a uniform tessellated grid of square shapes 302. This uniform tessellated grid may be mapped onto all of the BEOL layers of the IC chip, as illustrated in FIG. 3B. In an exemplary embodiment, each connector 370 may be centered over, for example, a 2×2 grid of square shapes that represents an interface region or area, where the shear forces are directed between the connector and the BEOL layers of the IC chip. Each of the 2×2 grid of square shapes may have a length and width equal to, for example, ½ that of a diameter of a BLM structure 365, which underlies each of the connectors 370.

The areas of design elements and the areas of dielectric within each BEOL layer may each be characterized by values of an elastic modulus. For example, one elastic modulus value may be associated with a particular dielectric material, used in a particular BEOL layer, while another elastic modulus value may be associated with a particular metal used in a design element of any of a metal fill, a metal line, and a metal via in the particular BEOL layer.

An elastic modulus map may be created that identifies the coordinates of each connector, which may be associated with the formation of white bumps, by using the estimated shear forces of the chip package interactions (CPIs) that are propagated through the connector to the interface region of the BEOL layers underlying each connector. The x, y, z coordinates of each design element may be provided by the design data of the software layout for each BEOL layer, to locate each of the design elements within the shapes of the uniform tessellated grid.

The elastic modulus of a material may relate to the force that generates a possible mechanical fracture in a material under a given strain, $$F = -(E\,A\,\Delta L)L_0,$$

where E is the modulus of elasticity, F is the force exerted on the material under tension, A is the original cross-sectional area through which the force is applied, $\Delta L$ is the amount by which the length of the object changes, and $L_0$ is the original length of the object. This formula may then be used to model the material as an ideal spring that obeys Hooke's law, as follows, $$F = -(E\,A/L_0)\Delta L = -k\,x,$$

where the factor $-(E\,A/L_0)$ is equated to the spring constant $-k$, and $\Delta L$ is equated to the change in length of the spring, x.

Figure 4:
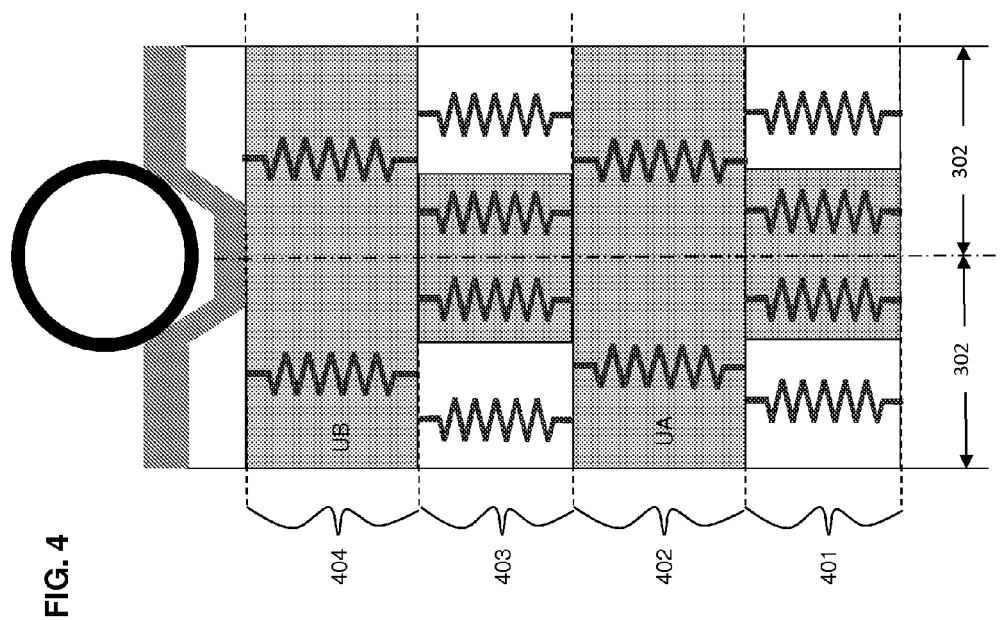
FIG. 4 illustrates a portion of a cross section of an IC chip that models the design elements and surrounding dielectric materials as springs in an exemplary embodiment.

FIG. 4 illustrates a cross section of an exemplary portion of an IC chip that may be modeled according to spring constants for design elements and surrounding dielectrics contained in each of four BEOL layers, which underlie a connector. Each portion of the BEOL layers may, for example, be divided in two by a centerline corresponding to a uniform grid of squares, and equal uniform cross sectional areas of the grid squares 302 may be located to each side of the centerline. In this example, the BEOL layers may comprise: a first BEOL layer 401, which includes a first metal via (gray) and surrounding portions of a dielectric (light); a second BEOL layer 402, which includes a metal fill, UA (gray); a third BEOL layer 403, which includes a second metal via (light); and a fourth BEOL layer 404, which includes a metal fill, UB, in an exemplary embodiment. The metal via (gray) of the first BEOL layer 401 may be equally apportioned between each of two grid squares 302. Each of the two portions of the metal via, corresponding to each of the two grid squares 302, may be modeled by a spring (vertical zigzag) using the elastic modulus of the metal comprising the metal via and the x, y, z coordinates of the metal via provided by the design data of the software layout for the first BEOL layer 401. Similarly, two portions of the dielectric (light) of the first BEOL layer 401, corresponding to each of the two grid squares 302 of the first BEOL layer 401, may be modeled by springs (vertical zigzags) using the elastic modulus of the dielectric and the x, y, z coordinates of each of the two portions of the two grid squares 302 of the dielectric in the first BEOL layer 401. Similarly, spring constants for each of the portions of metal design elements and dielectric in each of the grid squares of each the BEOL layers 402-404 may be determined.

In FIG. 4, each of the two grid squares 302 of the first BEOL layer 401 may comprise, for example, a metal material area equal to ½ of each grid square 302 and a dielectric material area equal to ½ of each grid square 302. The percentage of each grid square that is apportioned between the metal material area and the dielectric material area may be determined, for example, by a Monte Carlo method or analytically. In various exemplary embodiments, the design data from the software layout may provide a percentage of metal area resulting from any metal design element disposed in each grid square 302 and a percentage of dielectric area, which together equal the total area of each grid square 302 of each BEOL layer of an IC chip of the chip/device package. Similarly, spring constants for each of the percentages of each grid square for metal design elements and dielectric in each of the grid squares of each the BEOL layers 402-404 may be determined.

When modeling spring constants for each grid square of a BEOL layer comprising a percentage of a metal area and of a percentage of dielectric area, the individual springs modeling the metal area and the dielectric area of each square grid may be considered to be parallel spring constants. Thus, the spring constant for the metal area, $k_{metal}$, and for the dielectric area, $k_{dielectric}$, may be added to obtain a single equivalent spring constant, $k_{eq}$, for each grid square of each BEOL layer. When modeling a combined spring for corresponding grid squares through the stacked BEOL layers, a single equivalent spring constant for each of the stacked BEOL layers may be considered to be in series with the other stacked BEOL layers and may be combined according to: $1/k_{com} = 1/k_1 + 1/k_2 + \ldots + k_n$, where $k_{com}$ represents a combined spring constant for each grid square that extends through n stacked BEOL layers, and subscripts 1 . . . n identify the particular BEOL layer associated with each of the single equivalent spring constants.

As shown in the cross section of FIG. 3B, the feature size of design elements underlying a grid square of a topmost BEOL layer may decrease with increasing depth in the underlying BEOL layers of the IC chip. To capture information related to edges and corners of underlying smaller design elements, which contribute to the probability of white bump formation in grid squares of an overlying BEOL layer, it may be necessary to increase the granularity, i.e., the "fineness" of measurement, of the uniform square grid mapped onto the deeper BEOL layers, as illustrated in FIG. 5.

Figure 5:
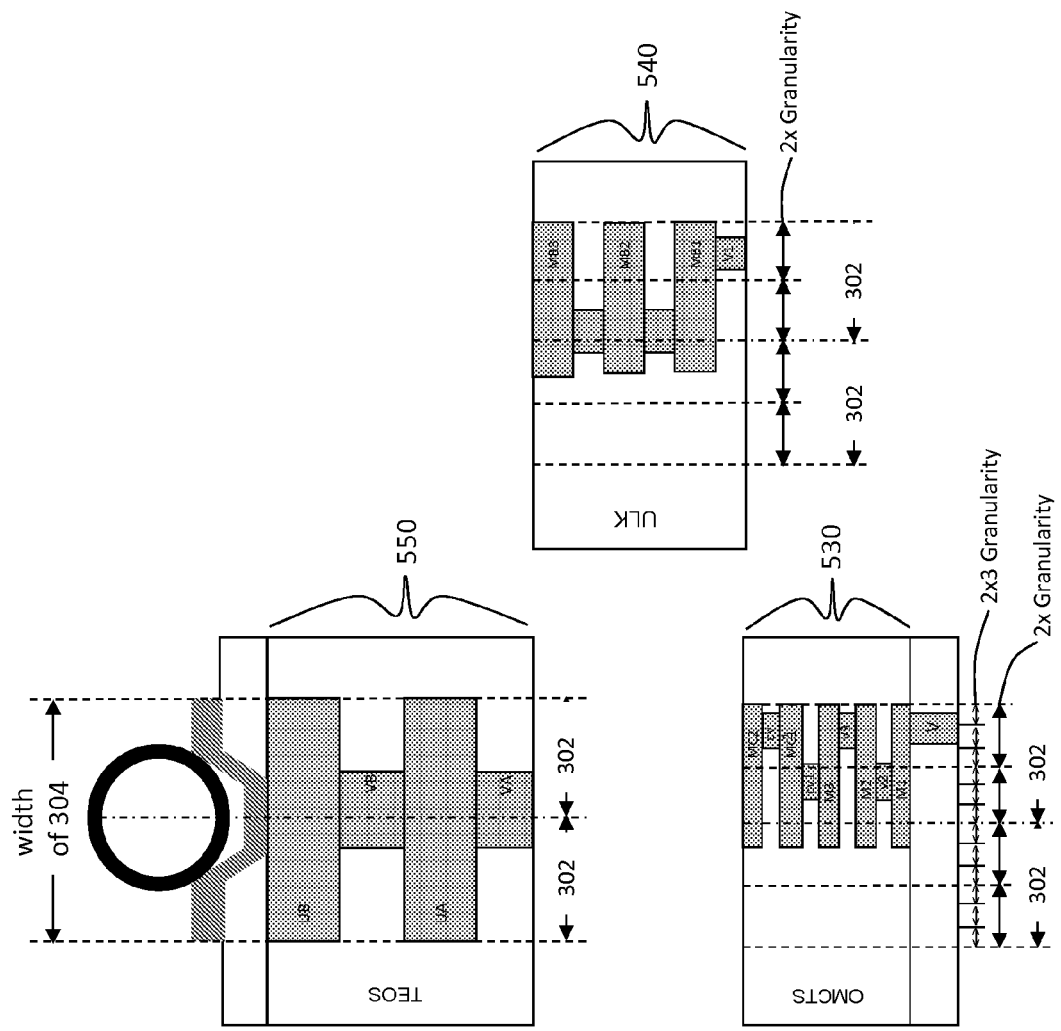
FIG. 5 illustrates three discontinuous partial cross sections of the metallization scheme levels of an IC chip that show an increasing granularity of an applied uniform tessellated grid to deeper metallization layers of the IC chip in an exemplary embodiment.

Referring to FIG. 5, a cross section of a topmost metallization scheme level 550 may illustrate a feature size of design elements UB, VB, UA, and VA that are mapped onto a uniform square grid, which is sized to grid squares having, for example, a length and width equal to ½ the diameter of a BLM structure, which underlies each of the connectors 370. However, in order to capture the finer detail of design elements in the intermediate metallization scheme level 540, the granularity of the uniform square grid applied to each of the BEOL layers in the intermediate metallization scheme level 540 may be increased by, for example, a factor of 2. Each uniform grid square of the topmost metallization scheme level 540 may now be congruent with an underlying 2×2 grid of grid squares in each of the BEOL layers of the intermediate metallization scheme level 540. Similarly, in order to capture the yet finer detail of design elements in the bottom most metallization scheme level 530, the granularity of the uniform square grid applied to each of the BEOL layers in the bottom most metallization scheme level 530 may be increased by, for example, a factor of 3. Thus, FIG. 5 illustrates three discontinuous partial cross section of the metallization scheme levels 550-530 of an IC chip: in which a first uniform square grid of grid squares 302, might be mapped to all of the BEOL layers of a topmost metallization scheme level 550 with comparatively large feature sizes; in which a second uniform square grid with a granularity of twice that of the first uniform square grid, having grid squares of an area equal to ¼ that of the area of grid squares 302, may be mapped to all of the BEOL layers of an intermediate metallization scheme level 540 with intermediate feature sizes; and in which a third uniform square grid having a granularity of three times that of the second uniform square grid, having grid squares of an area equal to 1/36 that of the area of grid squares 302, may be mapped to all of the BEOL layers of a bottom most metallization scheme level 530 with comparatively small feature sizes. The mapping of uniform grid squares of increasing granularities may allow for the contribution of edges and corners of a particular radial orientation to be captured with respect to the overlying uniform grid squares of a larger size. Although uniform square grids are discussed in the exemplary embodiments, above, uniform tessellated grids of any of squares, rectangle, triangle and hexagons may be applied to capture the finer detail of design elements in the deeper metallization scheme levels.

Where shear forces are great or the combined spring constants of the grid squares of each of the BEOL layers that underlie an individual connector, e.g., one of a solder bump and a Cu pillar, are relatively stiff, the design of the chip/device package may be modified, respectively, to reduce the shear forces propagated to the individual connector or to reduce the stiffness of the vertically aligned grid squares of the BEOL layers underlying the individual connector. Thus, the probability of a mechanical fracture, i.e., a "white bump", within the chip/device package may be lessened.

Figure 7B:
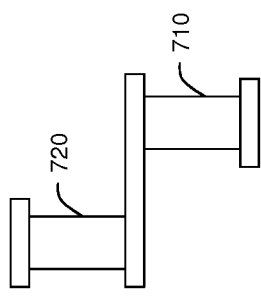
FIG. 7B illustrates a cross section of 2 metal vias that are staggered in two contiguous BEOL layers, each metal via being located within a single BEOL layer in an exemplary embodiment.
Figure 8B:
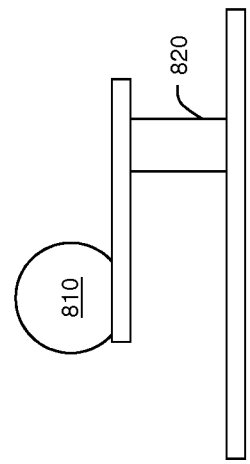
FIG. 8B illustrates a cross section of a connector that is laterally displaced from an underlying metal via of a BEOL layer in an exemplary embodiment.
Figure 7A:
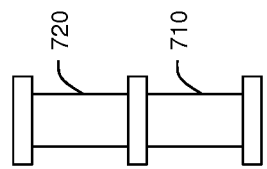
FIG. 7A illustrates a cross section of 2 metal vias that are vertically aligned in two contiguous BEOL layers, each metal via being located within a single BEOL layer in an exemplary embodiment.
Figure 8A:
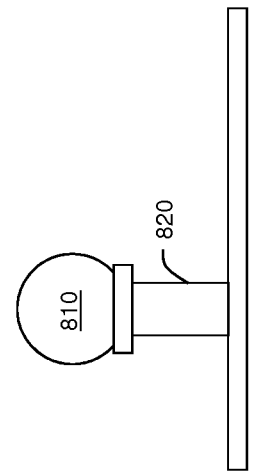
FIG. 8A illustrates a cross section of a connector that is vertically aligned over an underlying metal via of a BEOL layer in an exemplary embodiment.

A chip package interaction (CPI) stress transmitted by a connector, e.g., one of a solder bump and a Cu pillar, associated with a high probability of being a "white bump" failure, may be reduced by adding a neighboring connector to the existing connector footprint of the chip/device package. During chip-join and cool-down, the stress/strain generated by shear forces may be "shared" by adding a neighboring connector to the existing connector footprint of the chip/device package. The disposition of at least two neighboring connectors to the connector footprint of the chip/device package, where there had previously been but one connector, results in reducing the stress/strain propagated by each of the at least two neighboring connectors, relative to the stress/strain that had previously been applied to the one solitary connector.

Where shear forces are relatively high and the combined spring constants of vertically aligned grid squares of the elastic modulus map that underlies an individual connector are relatively stiff, the stiffness of the vertically aligned grid squares may be "softened" by reducing the elastic modulus of the combined and vertically aligned grid squares that underlie the connector. In FIG. 6A, for example, connector 610 may overlie a grid square of a BEOL layer that includes a metal fill 620. The connector 610 may be mechanically "isolated" from the relative stiffness of the metal fill 620 by replacing the metal fill 620 with a metal wire 630 of lesser width and having a greater compliance, as shown in FIG. 6B. In addition, the relative stiffness of at least two stacked metal vias 710, 720, as shown in FIG. 7A, may be "softened" by horizontally staggering the first conductive via 710 in a first BEOL layer relative to the second metal via 720 in a second BEOL layer, as shown in FIG. 7B. Similarly, as shown in FIG. 8A, connector 810 under which a metal via 820 is stacked may be "softened" by horizontally staggering the metal via 820 to connector 810 with a connecting mechanically compliant design element, e.g., a metal line. Although uniform square grids are discussed in the exemplary embodiments, above, uniform tessellated grid shapes of any of squares, rectangle, triangle and hexagons may be applied to "soften" the stiffness of vertically aligned grid shapes by reducing the elastic modulus of the vertically aligned grid shapes that underlie the connector.

Increasing the cross-sectional area of a solder bump may also reduce CPI stresses, because the stress/strain propagated through the individual solder bump may be spread over a larger area. Alternatively, decreasing the volume of an individual solder bump, while maintaining the distance between the IC chip and the multilayer electronic device, may result in a smaller cross-sectional area for an elongated solder bump connected to the IC chip. The smaller cross-sectional area of the elongated solder bump may require less force to plastically deform, resulting in elongation of the solder bump. This plastic deformation may reduce the stress/strain propagated by the elongated solder bump to the interface region of the solder bump and IC chip during chip-join and cool-down, and may reduce the probability of white bump formation.

Figure 9:
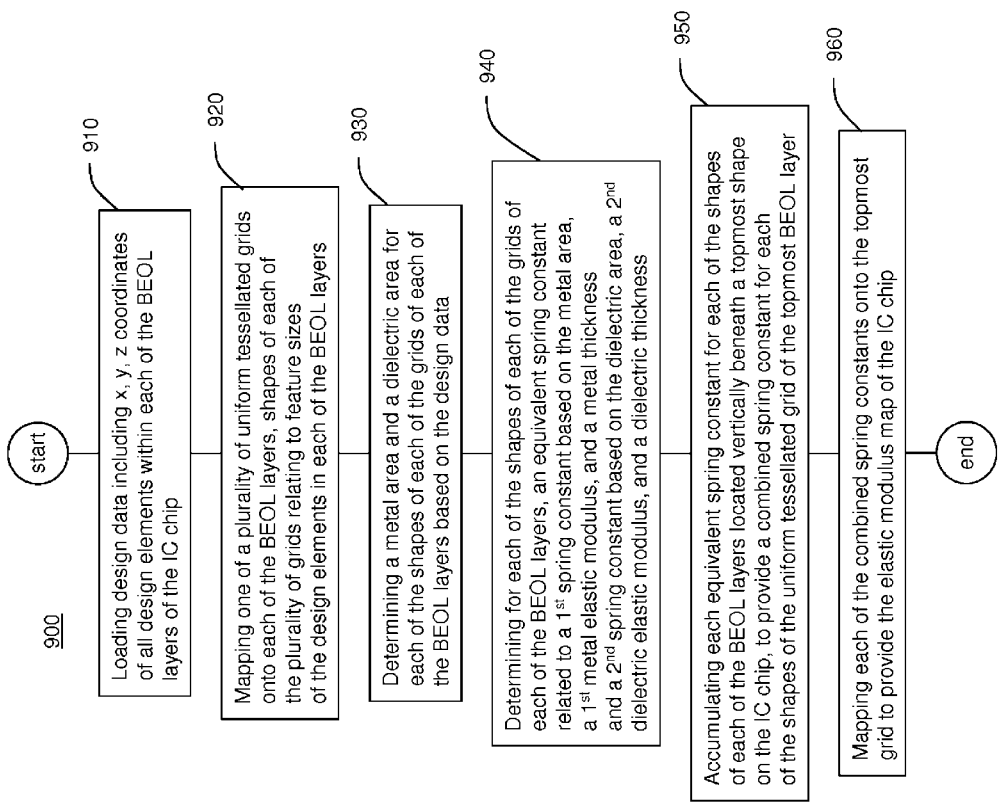
FIG. 9 illustrates a flow chart of a method for providing an elastic modulus map of an IC chip of a chip/device package in an exemplary embodiment.

Referring to FIG. 9, flow chart 900 illustrates an exemplary embodiment of a computer-implemented method for providing an elastic modulus map of an integrated circuit (IC) of a chip/device package. The method may include loading design data from a software layout program for the IC chip that includes the x, y, z coordinates of all design elements located within each back-end-of-line (BEOL) layer of a plurality of BEOL layers, 910. The design elements may include any of a metal fill, a metal line, and a metal via, and dielectric juxtaposed to the design elements. The design data may also include the elastic modulus for any dielectric material and for any metal material used in any of the design elements. The method may also include mapping one of a plurality of uniform tessellated grids onto each of the BEOL layers. Each of the plurality of uniform tessellated grids may comprise shapes that are related to feature sizes of the design elements located within each of the BEOL layers 920, where the shapes of each of the plurality of uniform tessellated grids applied to each BEOL layer and the corresponding feature sizes of the design elements of each BEOL layer decrease from a topmost BEOL layer to a bottom most BEOL layer of the IC chip. The x, y coordinates used by the software layout program, may define each of the shapes of the uniform tessellated grid applied to each of the BEOL layers. Each of the plurality of tessellated shapes may comprise one of squares, rectangles, triangles, and hexagons.

The method may further include determining a metal area and a dielectric area for each of the shapes of each of the plurality of uniform tessellated grids for each of the BEOL layers, based on the design data for any portion of any of the design elements located in each of the shapes, 930. The metal area and the dielectric area of each shape of each of the plurality of uniform tessellated grids may be determined by one of: a Monte Carlo method and an analytical method. The method may yet further include determining for each of the shapes of each one of the plurality of uniform tessellated grids for each of the BEOL layers, an equivalent spring constant related to a first spring constant based on the metal area, an elastic modulus value of the metal, and a metal thickness from the design data for any portions of any of the design elements in each of the shapes, and a second spring constant based on the dielectric area, a second elastic modulus value of the dielectric material, and a dielectric thickness from the design data, 940.

The method may yet further include accumulating each equivalent spring constant from each of the shapes of each of the plurality of uniform tessellated grids for each of the BEOL layers of the IC chip that is located beneath a shape of a topmost uniform tessellated grid, to provide a combined spring constant for each of the shapes of the topmost uniform square grid, 950. Each shape of the topmost uniform tessellated grid may be congruent with a whole number of shapes of a deeper uniform tessellated grid of a deeper BEOL layer having decreased feature sizes of the design elements relative to the feature sizes of the design elements of the topmost uniform tessellated grid. Finally, the method may include mapping each of the combined spring constants from each of the shapes of the topmost uniform tessellated grid to provide the elastic modulus map of the IC chip of the chip/device package, 960.

Figure 10:
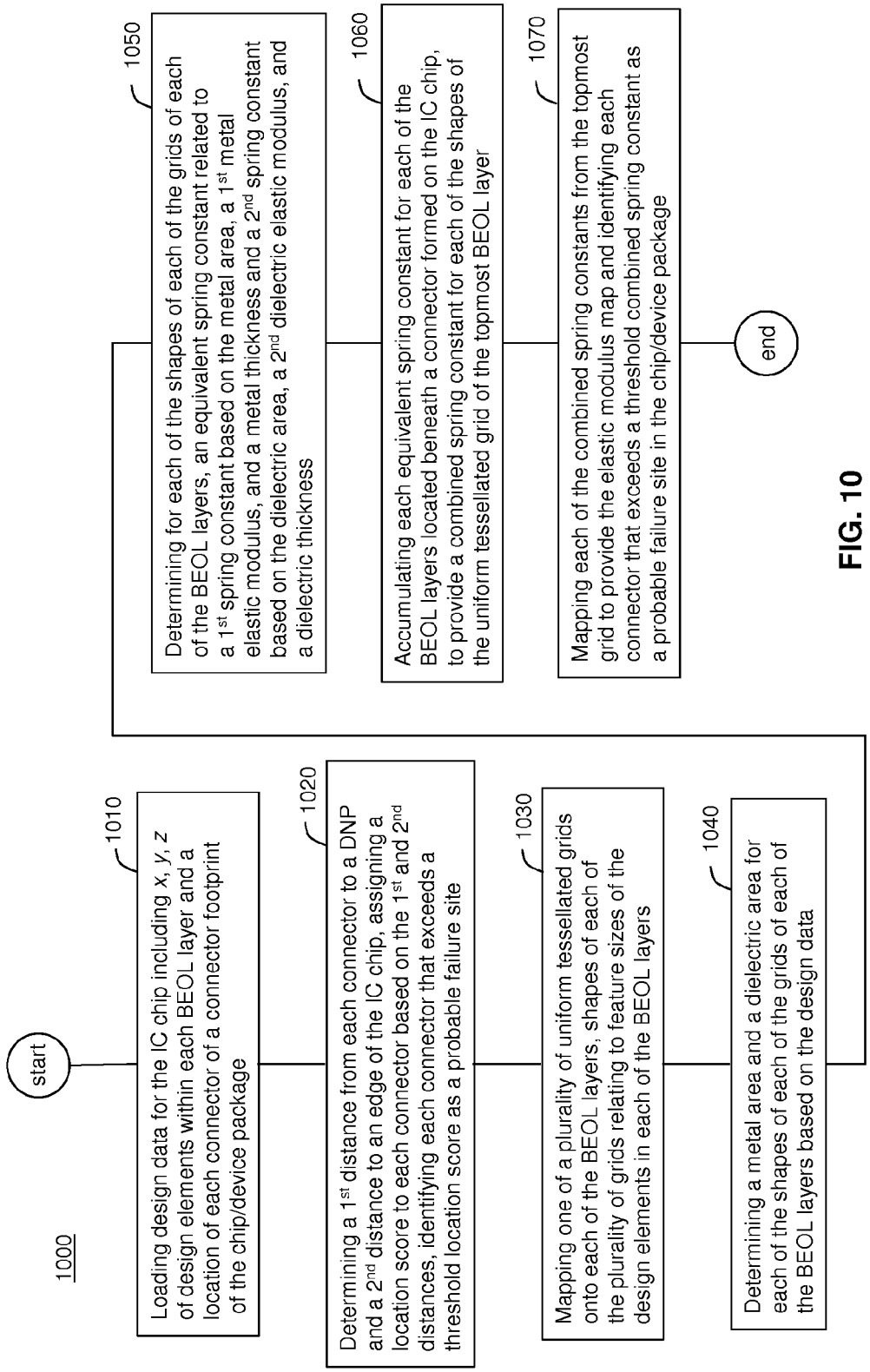
FIG. 10 illustrates a flow chart of a method for identifying a probable failure site of a chip/device package from an elastic modulus map of an IC chip of the chip/device package in an exemplary embodiment.

Referring to FIG. 10, flow chart 1000 illustrates an exemplary embodiment of a computer-implemented method for identifying a probable failure site of a chip/device package from an elastic modulus map of an integrated circuit (IC) chip of the chip/device package. The method may include loading design data for the chip/device package that includes x, y, z coordinates of design elements within each back-end-of line (BEOL) layer of a plurality of BEOL layers of the IC chip and an x, y coordinates for each connector from a connector footprint of the chip/device package, 1010. The design elements may comprise any of a metal fill, a metal line, and a metal via, and dielectric juxtaposed to the design elements. The design data may also include the elastic modulus for any dielectric material and for any metal material used in any of the design elements. The method may also include determining a first distance of each connector to a neutral point on a surface of the IC chip and a second distance from each connector to an edge of the surface of the IC chip, assigning a location score to each connector based on the first distance and the second distance, and identifying each connector that exceeds a threshold location score with a probable failure site of the chip/device package in the design data, 1020.

The method may further include mapping one of a plurality of uniform tessellated grids onto each of the BEOL layers, where each of the uniform tessellated grids may comprise shapes that are related to feature sizes of the design elements in each of the BEOL layers, and where the shapes of each of the uniform tessellated grids and the feature sizes of the design elements may decrease from a topmost BEOL layer to a bottom most BEOL layer, 1030. Each of the plurality of tessellated shapes may comprise one of squares, rectangles, triangles, and hexagons. The method may yet further include determining a metal area and a dielectric area for each of the shapes of each of the uniform tessellated grids for each of the BEOL layers, based on the design data for any portion of any of the design elements located in each of the shapes, 1040. The metal area and the dielectric area of each shape of each of the plurality of uniform tessellated grids may be determined by one of: a Monte Carlo method and an analytical method.

The method may yet further include determining for each of the shapes of each one of the uniform tessellated grids for each of the BEOL layers, an equivalent spring constant related to a first spring constant based on the metal area, a first elastic modulus of the metal, and a metal thickness from the design data, and a second spring constant based on the dielectric area, a second elastic modulus of the dielectric material, and a dielectric thickness from the design data, 1050. The method may yet further include accumulating each equivalent spring constant from each of the shapes of each of the uniform tessellated grids for each of the BEOL layers of the IC chip that is located beneath each connector, to provide a combined spring constant for each of the shapes of a topmost uniform tessellated grid located beneath each connector, 1060. Each shape of the topmost uniform tessellated grid may be congruent with a whole number of shapes of a deeper uniform tessellated grid of a deeper BEOL layer having decreased feature sizes of the design elements relative to the feature sizes of the design elements of the topmost uniform tessellated grid of the topmost BEOL layer.

Finally, the method may include mapping each of the combined spring constants from each of the shapes of the topmost uniform tessellated grid located beneath each connector to provide the elastic modulus map of the IC chip of the chip/device package, and identifying each connector that exceeds a threshold combined spring constant in the elastic modulus map with a probable failure site of the chip/device package in the design data, 1070.

The method may yet further include selecting a local grid area of the topmost uniform tessellated grid centered on each connector, assigning a local density score to each connector based on a number of connectors in the local grid area, and identifying each connector with a local density score of less than a threshold local density score with a probable failure site of the chip/device package in the design data. Similarly, the method may yet further include selecting a global grid area of the topmost uniform tessellated grid centered on each connector, where the global grid area may be greater than that of the local grid area, assigning a global density score to each connector based on a number of connectors in global grid area, and identifying each connector with a global density score of less than a threshold global density score with a probable failure site of the chip/device package in the design data.

The method may yet further include determining gradients of the combined spring constants between each of the shapes and adjacent shapes for of each of the uniform tessellated grids for each of the BEOL layers located beneath each connector, assigning a maximal gradient score based on an absolute difference between each of the shapes and the adjacent shapes, and identifying each connector that exceeds a threshold maximal gradient score with a probable failure site of the chip/device package in the design data. The method may yet further include determining a cumulative score based on the location score, the local density score, the global density score, the maximal gradient score, and the combined spring constant for each of the shapes of each one of the uniform tessellated grids for each of the BEOL layers that is located beneath each connector, and identifying each connector that exceeds a threshold cumulative score with a probable failure site of the chip/device package in the design data.

Figure 11:
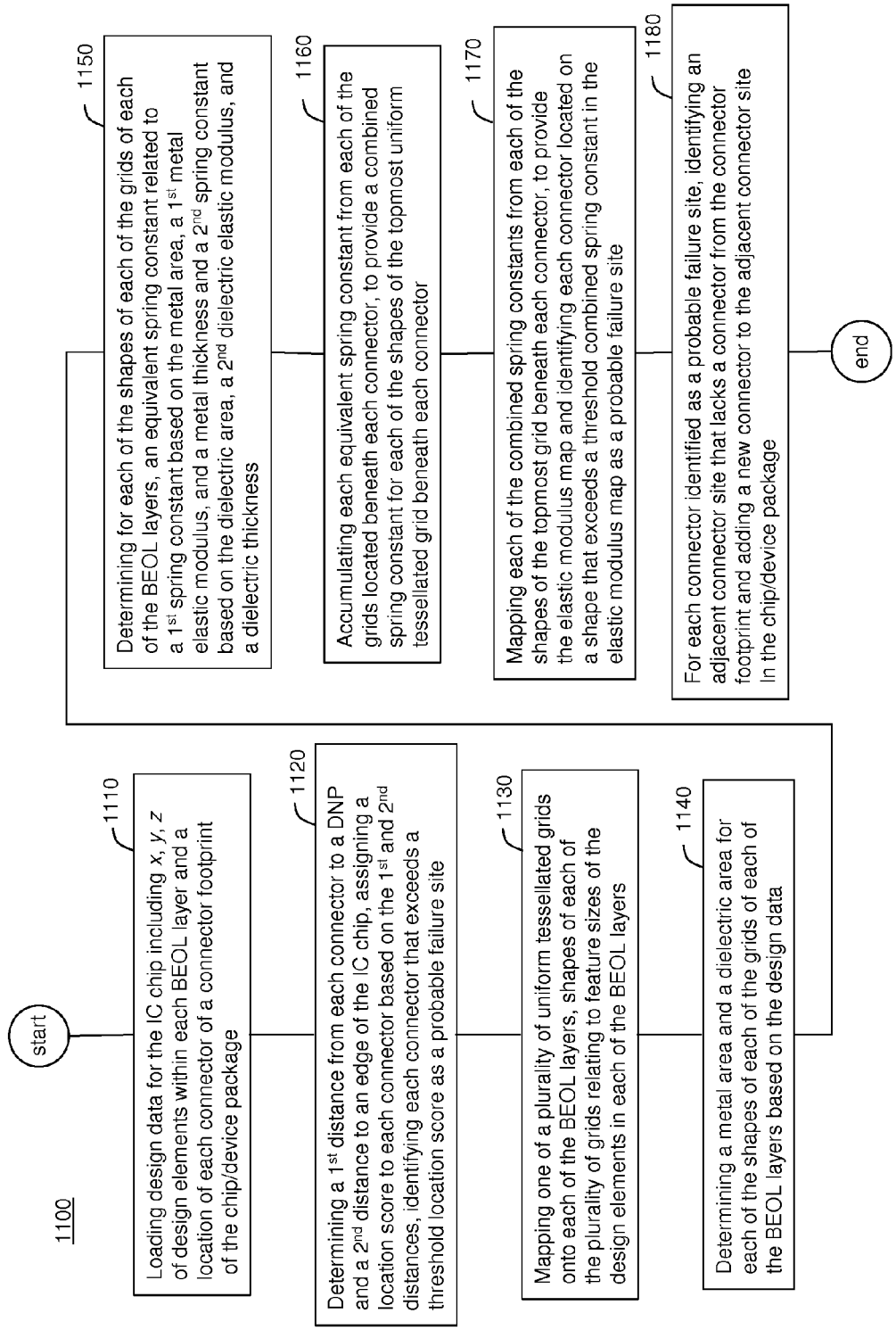
FIG. 11 illustrates a flow chart of a method for modifying a connector footprint of a chip/device package, based on identifying a probable failure site of the chip/device package from an elastic modulus map of an IC chip of the chip/device package in an exemplary embodiment.

Referring to FIG. 11, flow chart 1100 illustrates an exemplary embodiment of a computer-implemented method for modifying a connector footprint of a chip/device package, based on identifying a probable failure site of the chip/device package from an elastic modulus map of an integrated circuit (IC) chip of the chip/device package. The method may include loading design data for the chip/device package that includes x, y, z coordinates of design elements within each back-end-of line (BEOL) layer of a plurality of BEOL layers of the IC chip and an x, y coordinates for each connector from a connector footprint of the chip/device package, 1110. The design elements may comprise any of a metal fill, a metal line, and a metal via, and dielectric juxtaposed to the design elements. The design data may also include the elastic modulus for any dielectric material and for any metal material used in any of the design elements. The method may also include determining a first distance of each connector to a neutral point on a surface of the IC chip and a second distance from each connector to an edge of the surface of the IC chip, assigning a location score to each connector based on the first distance and the second distance, and identifying each connector that exceeds a threshold location score with a probable failure site of the chip/device package in the design data, 1120.

The method may further include mapping one of a plurality of uniform tessellated grids onto each of the BEOL layers, where each of the uniform tessellated grids may comprise shapes that are related to feature sizes of the design elements in each of the BEOL layers, and where the shapes of each of the uniform tessellated grids and the feature sizes of the design elements may decrease from a topmost BEOL layer to a bottom most BEOL layer, 1130. Each of the plurality of tessellated shapes may comprise one of squares, rectangles, triangles, and hexagons. The method may yet further include determining a metal area and a dielectric area for each of the shapes of each of the uniform tessellated grids for each of the BEOL layers, based on the design data for any portion of any of the design elements located in each of the shapes, 1140. The metal area and the dielectric area of each shape of each of the plurality of uniform tessellated grids may be determined by one of: a Monte Carlo method and an analytical method.

The method may yet further include determining for each of the shapes of each one of the uniform tessellated grids for each of the BEOL layers, an equivalent spring constant related to a first spring constant based on the metal area, a first elastic modulus of the metal, and a metal thickness from the design data, and a second spring constant based on the dielectric area, a second elastic modulus of the dielectric material, and a dielectric thickness from the design data, 1150. The method may yet further include accumulating each equivalent spring constant from each of the shapes of each of the uniform tessellated grids for each of the BEOL layers of the IC chip that is located beneath each connector, to provide a combined spring constant for each of the shapes of a topmost uniform tessellated grid located beneath each connector, 1160. Each shape of the topmost uniform tessellated grid may be congruent with a whole number of shapes of a deeper uniform tessellated grid of a deeper BEOL layer having decreased feature sizes of the design elements relative to the feature sizes of the design elements of the topmost uniform tessellated grid of the topmost BEOL layer.

The method may yet further include mapping each of the combined spring constants from each of the shapes of the topmost uniform tessellated grid located beneath each connector to provide the elastic modulus map of the IC chip of the chip/device package, and identifying each connector located above a shape of the topmost uniform tessellated grid that exceeds a threshold combined spring constant in the elastic modulus map with a probable failure site of the chip/device package in the design data, 1170. For each connector identified as a probable failure site of the chip/device package in the design data, the method may finally include identifying an adjacent connector site that lacks a connector from the connector footprint of the chip/device package, and adding a new connector to the adjacent connector site, to reduce shear forces propagated into the probable failure site, 1180.

The method may yet further include selecting a local grid area of the topmost uniform tessellated grid centered on each connector, assigning a local density score to each connector based on a number of connectors in the local grid area, and identifying each connector with a local density score of less than a threshold local density score with a probable failure site of the chip/device package in the design data. Similarly, the method may yet further include selecting a global grid area of the topmost uniform tessellated grid centered on each connector, where the global grid area may be greater than that of the local grid area, assigning a global density score to each connector based on a number of connectors in global grid area, and identifying each connector with a global density score of less than a threshold global density score with a probable failure site of the chip/device package in the design data.

The method may yet further include determining gradients of the combined spring constants between each of the shapes and adjacent shapes for of each of the uniform tessellated grids for each of the BEOL layers located beneath each connector, assigning a maximal gradient score based on an absolute difference between each of the shapes and the adjacent shapes, and identifying each connector that exceeds a threshold maximal gradient score with a probable failure site of the chip/device package in the design data. The method may yet further include determining a cumulative score based on the location score, the local density score, the global density score, the maximal gradient score, and the combined spring constant for each of the shapes of each one of the uniform tessellated grids for each of the BEOL layers that is located beneath each connector, and identifying each connector that exceeds a threshold cumulative score with a probable failure site of the chip/device package in the design data.

Figure 12:
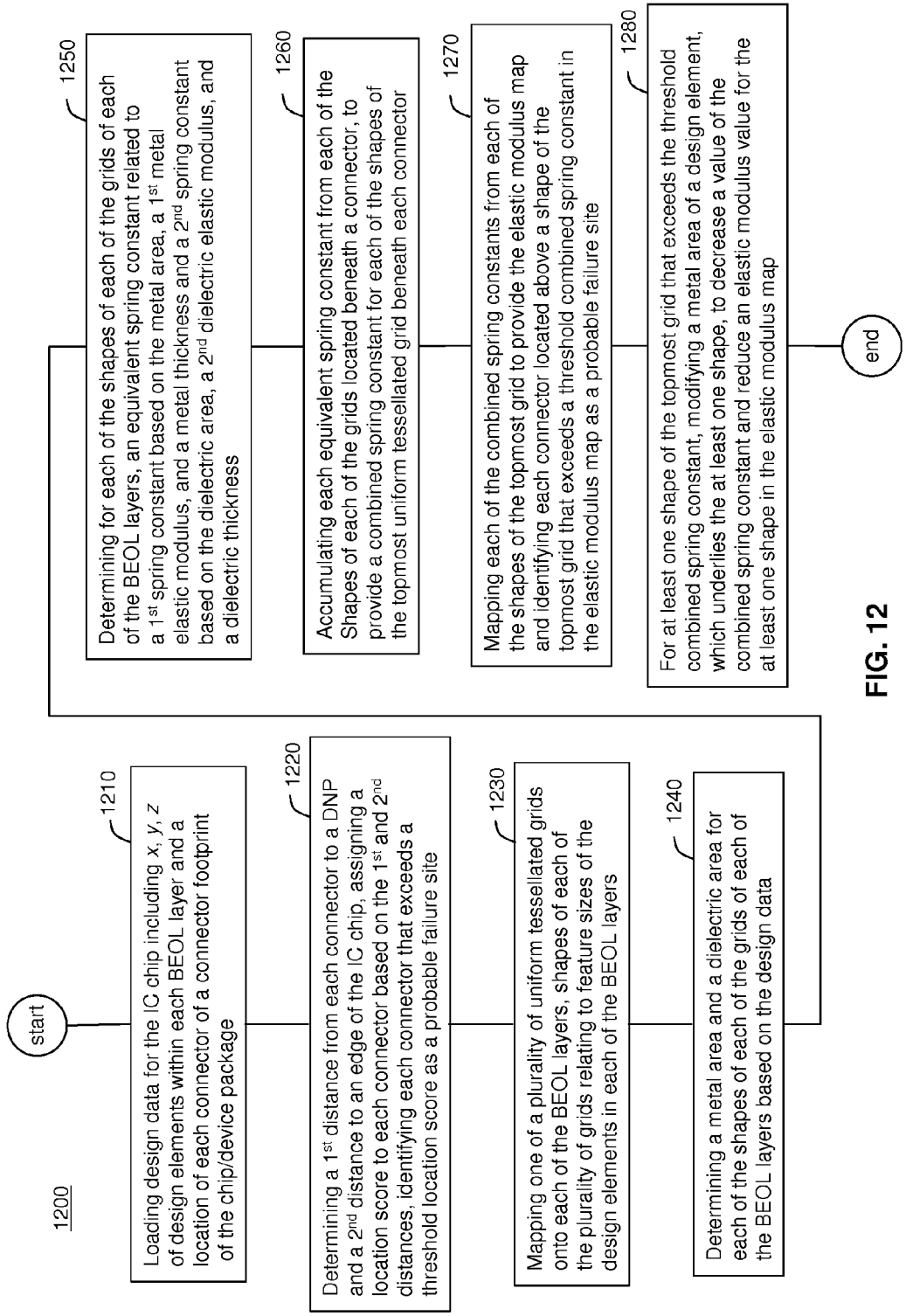
FIG. 12 illustrates a flow chart of a method for modifying an integrated circuit (IC) chip of a chip/device package, based on identifying a probable failure site of the chip/device package from an elastic modulus map of the IC chip in an exemplary embodiment.

Referring to FIG. 12, flow chart 1200 illustrates an exemplary embodiment of a computer-implemented method for modifying an integrated circuit (IC) chip of a chip/device package, based on identifying a probable failure site of the chip/device package from an elastic modulus map the IC chip. The method may include loading design data for the chip/device package that includes x, y, z coordinates of design elements within each back-end-of line (BEOL) layer of a plurality of BEOL layers of the IC chip and an x, y coordinates for each connector from a connector footprint of the chip/device package, 1210. The design elements may comprise any of a metal fill, a metal line, and a metal via, and dielectric juxtaposed to the design elements. The design data may also include the elastic modulus for any dielectric material and for any metal material used in any of the design elements. The method may also include determining a first distance of each connector to a neutral point on a surface of the IC chip and a second distance from each connector to an edge of the surface of the IC chip, assigning a location score to each connector based on the first distance and the second distance, and identifying each connector that exceeds a threshold location score with a probable failure site of the chip/device package in the design data, 1220.

The method may further include mapping one of a plurality of uniform tessellated grids onto each of the BEOL layers, where each of the uniform tessellated grids may comprise shapes that are related to feature sizes of the design elements in each of the BEOL layers, and where the shapes of each of the uniform tessellated grids and the feature sizes of the design elements may decrease from a topmost BEOL layer to a bottom most BEOL layer, 1230. Each of the plurality of tessellated shapes may comprise one of squares, rectangles, triangles, and hexagons. The method may yet further include determining a metal area and a dielectric area for each of the shapes of each of the uniform tessellated grids for each of the BEOL layers, based on the design data for any portion of any of the design elements located in each of the shapes, 1240. The metal area and the dielectric area of each shape of each of the plurality of uniform tessellated grids may be determined by one of: a Monte Carlo method and an analytical method.

The method may yet further include determining for each of the shapes of each one of the uniform tessellated grids for each of the BEOL layers, an equivalent spring constant related to a first spring constant based on the metal area, a first elastic modulus of the metal, and a metal thickness from the design data, and a second spring constant based on the dielectric area, a second elastic modulus of the dielectric material, and a dielectric thickness from the design data, 1250. The method may yet further include accumulating each equivalent spring constant from each of the shapes of each of the uniform tessellated grids for each of the BEOL layers of the IC chip that is located beneath each connector, to provide a combined spring constant for each of the shapes of a topmost uniform tessellated grid located beneath each connector, 1260. Each shape of the topmost uniform tessellated grid of the topmost BEOL layer may be congruent with a whole number of shapes of a deeper uniform tessellated grid of a deeper BEOL layer having decreased feature sizes of the design elements relative to the feature sizes of the design elements of the topmost uniform tessellated grid of the topmost BEOL layer.

The method may yet further include mapping each of the combined spring constants from each of the shapes of the topmost uniform tessellated grid located beneath each connector to provide the elastic modulus map of the IC chip of the chip/device package, and identifying each connector located above a shape of the topmost uniform tessellated grid that exceeds a threshold combined spring constant in the elastic modulus map with a probable failure site of the chip/device package in the design data, 1270. For at least one shape of the topmost uniform tessellated grid that exceeds the threshold combined spring constant in the elastic modulus map, the method may finally include modifying a metal area of a design element from at least one of the shapes in at least one of the plurality of uniform tessellated grids for each of the BEOL layers of the IC chip, which underlies the at least one shape of the topmost uniform tessellated grid, to decrease a value of the combined spring constant for the at least one shape in the elastic modulus map and reduce an elastic modulus value for the at least one shape, 1280.

Alternatively, decreasing the value of the combined spring constant, described by the method above, may be accomplished by staggering a second via in a second BEOL layer, relative to a first via in the a BEOL layer located in any of the shapes of each one of the plurality of uniform tessellated grids for each of the BEOL layers identified as a probable mechanical failure site in the design data.

The method may yet further include selecting a local grid area of the topmost uniform tessellated grid centered on each connector, assigning a local density score to each connector based on a number of connectors in the local grid area, and identifying each connector with a local density score of less than a threshold local density score with a probable failure site of the chip/device package in the design data. Similarly, the method may yet further include selecting a global grid area of the topmost uniform tessellated grid centered on each connector, where the global grid area may be greater than that of the local grid area, assigning a global density score to each connector based on a number of connectors in global grid area, and identifying each connector with a global density score of less than a threshold global density score with a probable failure site of the chip/device package in the design data.

The method may yet further include determining gradients of the combined spring constants between each of the shapes and adjacent shapes for of each of the uniform tessellated grids for each of the BEOL layers located beneath each connector, assigning a maximal gradient score based on an absolute difference between each of the shapes and the adjacent shapes, and identifying each connector that exceeds a threshold maximal gradient score with a probable failure site of the chip/device package in the design data. The method may yet further include determining a cumulative score based on the location score, the local density score, the global density score, the maximal gradient score, and the combined spring constant for each of the shapes of each one of the uniform tessellated grids for each of the BEOL layers that is located beneath each connector, and identifying each connector that exceeds a threshold cumulative score with a probable failure site of the chip/device package in the design data.

As will be appreciated by one skilled in the art, aspects of the systems and methods herein may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may be any computer readable medium that is not a computer readable storage medium and that can communicate, propagate, or transport a program for use by or in connection with an instruction execution system, apparatus, or device.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments herein. It will be understood that each block of the flowchart illustrations and/or two-dimensional block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 13:
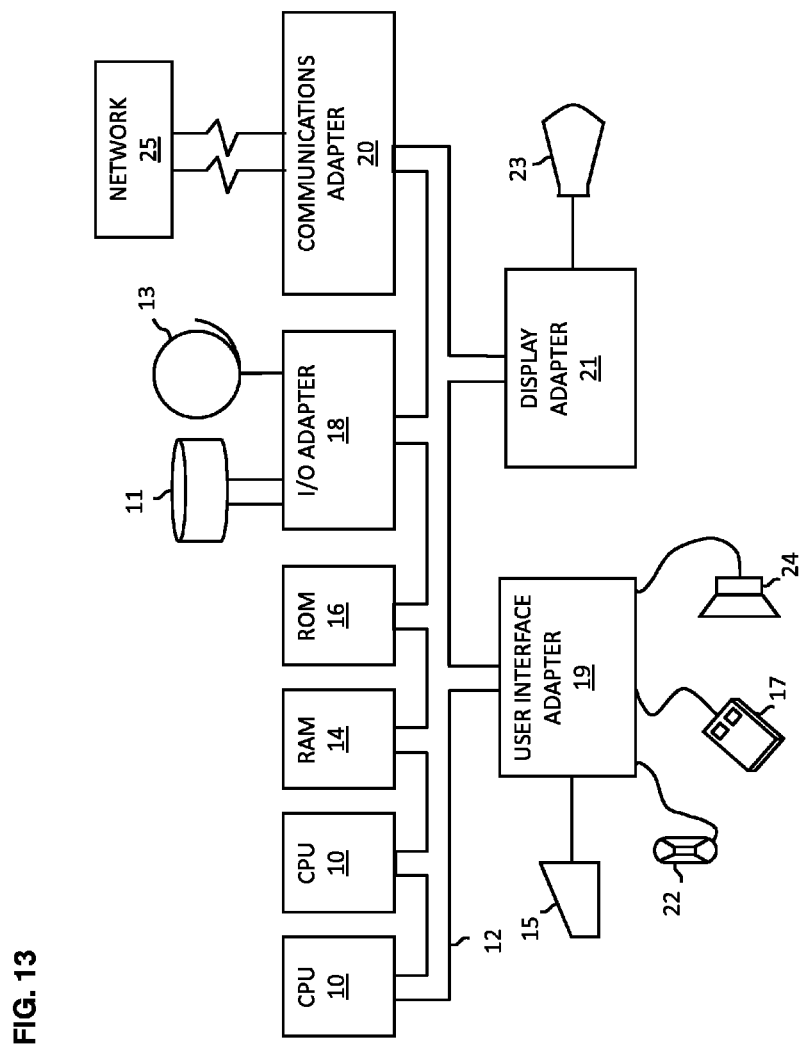
FIG. 13 illustrates a schematic of a representative hardware environment for practicing the methods of the exemplary embodiments.

A representative hardware environment for practicing the embodiments herein is depicted in FIG. 13. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the figures illustrate the architecture, functionality, and operation of possible implementations of systems, methods and computer program products according to various embodiments herein. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

What is claimed is:

1. A computer-implemented method for providing an elastic modulus map of an integrated circuit (IC) chip of a chip/device package, said method comprising:
    loading, by a computer, design data for said IC chip that includes x, y, z coordinates of design elements within each back-end-of line (BEOL) layer of a plurality of BEOL layers, said design elements comprising any of a metal fill, a metal line, and a metal via, and dielectric juxtaposed to said design elements;
    mapping, by said computer, one of a plurality of uniform tessellated grids onto each of said BEOL layers, each of said plurality of uniform tessellated grids comprising shapes related to feature sizes of said design elements in each of said BEOL layers, said shapes of each of said uniform tessellated grids and said feature sizes of said design elements decreasing from a topmost BEOL layer to a bottom most BEOL layer;
    determining, by said computer, a metal area and a dielectric area for each of said shapes of each of said plurality of uniform tessellated grids for each of said BEOL layers, based on said design data for any portion of any of said design elements located in each of said shapes;
    determining, by said computer, for each of said shapes of each one of said uniform tessellated grids for each of said BEOL layers, an equivalent spring constant related to a first spring constant based on said metal area, a first elastic modulus of said metal, and a metal thickness from said design data, and a second spring constant based on said dielectric area, a second elastic modulus of said dielectric, and a dielectric thickness from said design data;
    accumulating, by said computer, each equivalent spring constant from each of said shapes of each of said uniform tessellated grids for each of said BEOL layers of said IC chip that is located beneath a shape of a topmost uniform tessellated grid, to provide a combined spring constant for each of said shapes of said topmost uniform tessellated grid; and
    mapping, by said computer, each of said combined spring constants from each of said shapes of said topmost uniform tessellated grid, to provide said elastic modulus map of said IC chip of said chip/device package.

2. The method of claim 1, each of said shapes of each of said uniform tessellated grids comprising one of squares, rectangles, triangles, and hexagons.

3. The method of claim 1, said metal area and said dielectric area of each shape of each of said plurality of uniform tessellated grids being determined by one of: a Monte Carlo method and an analytical method.

4. The method of claim 1, each shape of said topmost uniform tessellated grid being congruent with a whole number of shapes of a deeper uniform tessellated grid of a deeper BEOL layer having decreased feature sizes of said design elements relative to said feature sizes of said design elements of said topmost uniform tessellated grid.

5. The method of claim 1, said IC chip of said chip/device package comprising: silicon layers; a barrier layer formed on said silicon layers; a plurality of BEOL layers, each comprising any of said design elements formed on said barrier layer; and a passivation layer formed on said plurality of BEOL layers.

6. A computer-implemented method for identifying a probable failure site of a chip/device package from an elastic modulus map of an integrated circuit (IC) chip of said chip/device package, said method comprising:

loading, by a computer, design data for said chip/device package that includes: x, y, z coordinates of design elements within each back-end-of line (BEOL) layer of a plurality of BEOL layers of said IC chip, said design elements comprising any of a metal fill, a metal line, and a metal via, and dielectric juxtaposed to said design elements; and x, y coordinates for each connector from a connector footprint of said chip/device package;

determining, by said computer, a first distance of said each connector to a neutral point on a surface of said IC chip and a second distance from said each connector to an edge of said surface of said IC chip, assigning a location score to said each connector based on said first distance and said second distance, and identifying said each connector that exceeds a threshold location score with a probable failure site of said chip/device package in said design data;

mapping, by said computer, one of a plurality of uniform tessellated grids onto each of said BEOL layers, each of said uniform tessellated grids comprising shapes that are related to feature sizes of said design elements in each of said BEOL layers, said shapes of each of said uniform tessellated grids and said feature sizes of said design elements decreasing from a topmost BEOL layer to a bottom most BEOL layer;

determining, by said computer, a metal area and a dielectric area for each of said shapes of each of said uniform tessellated grids for each of said BEOL layers, based on said design data for any portion of any of said design elements in each of said shapes;

determining, by said computer, for each of said shapes of each one of said uniform tessellated grids for each of said BEOL layers, an equivalent spring constant related to a first spring constant based on said metal area, a first elastic modulus of said metal, and a metal thickness from said design data, and a second spring constant based on said dielectric area, a second elastic modulus of said dielectric, and a dielectric thickness from said design data;

accumulating, by said computer, each equivalent spring constant from each of said shapes of each of said uniform tessellated grids for each of said BEOL layers of said IC chip that is located beneath said each connector, to provide a combined spring constant for each of said shapes of a topmost uniform tessellated grid located beneath said each connector; and mapping, by said computer, each of said combined spring constants from each of said shapes of said topmost uniform tessellated grid located beneath said each connector, to provide said elastic modulus map of said IC chip of said chip/device package, and identifying said each connector that exceeds a threshold combined spring constant in said elastic modulus map with a probable failure site of said chip/device package in said design data.

7. The method of claim 6, each of said shapes of each of said uniform tessellated grids comprising one of squares, rectangles, triangles, and hexagons.

8. The method of claim 6, each shape of said topmost uniform tessellated grid being congruent with a whole number of shapes of a deeper uniform tessellated grid of a deeper BEOL layer having decreased feature sizes of said design elements relative to said feature sizes of said design elements of said topmost uniform tessellated grid of said topmost BEOL layer.

9. The method of claim 6, further comprising:

selecting, by said computer, a local grid area of said topmost uniform tessellated grid centered on said each connector, assigning a local density score to said each connector based on a number of connectors in said local grid area, and identifying said each connector with a local density score of less than a threshold local density score with a probable failure site of said chip/device package in said design data; and selecting, by said computer, a global grid area of said topmost uniform tessellated grid centered on said each connector, said global grid area being greater than said local grid area, assigning a global density score to said each connector based on a number of connectors in said global grid area, and identifying said each connector with a global density score of less than a threshold global density score with a probable failure site of said chip/device package in said design data.

10. The method of claim 9, further comprising determining, by said computer, gradients of said combined spring constants between each of said shapes and adjacent shapes for of each of said uniform tessellated grids for each of said BEOL layers located beneath said each connector, assigning a maximal gradient score based on an absolute difference between each of said shapes and said adjacent shapes, and identifying said each connector that exceeds a threshold maximal gradient score with a probable failure site of said chip/device package in said design data.

11. The method of claim 10, further comprising determining, by said computer, a cumulative score based on said location score, said local density score, said global density score, and said combined spring constant for each of said shapes of each one of said uniform tessellated grids for each of said BEOL layers that is located beneath said each connector, and identifying said each connector that exceeds a threshold cumulative score with a probable failure site of said chip/device package in said design data.

12. A computer-implemented method for modifying a connector footprint of a chip/device package, based on identifying a probable failure site of said chip/device package from an elastic modulus map of an integrated circuit (IC) chip of said chip/device package, said method comprising:

loading, by a computer, design data for said chip/device package that includes: x, y, z coordinates of design elements located within each back-end-of line (BEOL) layer of a plurality of BEOL layers of said IC chip, said design elements comprising any of a metal fill, a metal line, and a metal via, and dielectric juxtaposed to said design elements; and x, y coordinates for each connector from a connector footprint of said chip/device package;

determining, by said computer, a first distance of said each connector to a neutral point on a surface of said IC chip and a second distance from said each connector to an edge of said surface of said IC chip, assigning a location score to said each connector based on said first distance and said second distance, and identifying said each connector that exceeds a threshold location score with a probable failure site of said chip/device package in said design data;

mapping, by said computer, one of a plurality of uniform tessellated grids onto each of said BEOL layers, each of said uniform tessellated grids comprising shapes that are related to feature sizes of said design elements in each of said BEOL layers, said shapes of each of said uniform tessellated grids and said feature sizes of said design elements decreasing from a topmost BEOL layer to a bottom most BEOL layer;

determining, by said computer, a metal area and a dielectric area for each of said shapes of each of said uniform tessellated grids for each of said BEOL layers, based on said design data for any portion of any of said design elements in each of said shapes;

determining, by said computer, for each of said shapes of each one of said uniform tessellated grids for each of said BEOL layers, an equivalent spring constant related to a first spring constant based on said metal area, a first elastic modulus of said metal, and a metal thickness from said design data, and a second spring constant based on said dielectric area, a second elastic modulus of said dielectric, and a dielectric thickness from said design data;

accumulating, by said computer, each equivalent spring constant from each of said shapes of each of said uniform tessellated grids for each of said BEOL layers of said IC chip that is located beneath said each connector, to provide a combined spring constant for each of said shapes of a topmost uniform tessellated grid located beneath said each connector; and mapping, by said computer, each of said combined spring constants from each of said shapes of said topmost uniform tessellated grid located beneath said each connector to provide said elastic modulus map of said IC chip of said chip/device package, and identifying said each connector located above a shape of said topmost uniform tessellated grid that exceeds a threshold combined spring constant in said elastic modulus map with a probable failure site of said chip/device package in said design data; and for said each connector identified as a probable failure site of said chip/device package in said design data, identifying, by said computer, an adjacent connector site that lacks a connector from said connector footprint of said chip/device package, and adding a new connector to said adjacent connector site, to reduce shear forces propagated into said probable failure site.

13. The method of claim 12, each of said shapes of each of said uniform tessellated grids comprising one of squares, rectangles, triangles, and hexagons.

14. The method of claim 12, each shape of said topmost uniform tessellated grid being congruent with a whole number of shapes of a deeper uniform tessellated grid of a deeper BEOL layer having decreased feature sizes of said design elements relative to said feature sizes of said design elements of said topmost uniform tessellated grid of said topmost BEOL layer.

15. The method of claim 12, further comprising:

selecting, by said computer, a local grid area of said topmost uniform tessellated grid centered on said each connector, assigning a local density score to said each connector based on a number of connectors in said local grid area, and identifying said each connector with a local density score of less than a threshold local density score with a probable failure site of said chip/device package in said design data; and selecting, by said computer, a global grid area of said topmost uniform tessellated grid centered on said each connector, said global grid area being greater than said local grid area, assigning a global density score to said each connector based on a number of connectors in said global grid area, and identifying said each connector with a global density score of less than a threshold global density score with a probable failure site of said chip/device package in said design data.

16. The method of claim 15, further comprising determining, by said computer, gradients of said combined spring constants between each of said shapes and adjacent shapes for of each of said uniform tessellated grids for each of said BEOL layers located beneath said each connector, assigning a maximal gradient score based on an absolute difference between each of said shapes and said adjacent shapes, and identifying said each connector that exceeds a threshold maximal gradient score with a probable failure site of said chip/device package in said design data.

17. The method of claim 16, further comprising determining, by said computer, a cumulative score based on said location score, said local density score, said global density score, and said combined spring constant for each of said shapes of each one of said uniform tessellated grids for each of said BEOL layers that is located beneath said each connector, and identifying said each connector that exceeds a threshold cumulative score with a probable failure site of said chip/device package in said design data.

18. A computer-implemented method for modifying an integrated circuit (IC) chip of a chip/device package, based on identifying a probable failure site of said chip/device package from an elastic modulus map of said IC chip, said method comprising:

loading, by a computer, design data for said chip/device package that includes: x, y, z coordinates of design elements located within each back-end-of line (BEOL) layer of a plurality of BEOL layers of said IC chip, said design elements comprising any of a metal fill, a metal line, and a metal via, and dielectric juxtaposed to said design elements; and x, y coordinates for each connector from a connector footprint of said chip/device package;

determining, by said computer, a first distance of said each connector to a neutral point on a surface of said IC chip and a second distance from said each connector to an edge of said surface of said IC chip, assigning a location score to said each connector based on said first distance and said second distance, and identifying said each connector that exceeds a threshold location score with a probable failure site of said chip/device package in said design data;

mapping, by said computer, one of a plurality of uniform tessellated grids onto each of said BEOL layers, each of said uniform tessellated grids comprising shapes that are related to feature sizes of said design elements in each of said BEOL layers, said shapes of each of said uniform tessellated grids and said feature sizes of said design elements decreasing from a topmost BEOL layer to a bottom most BEOL layer;

determining, by said computer, a metal area and a dielectric area for each of said shapes of each of said uniform tessellated grids for each of said BEOL layers, based on said design data for any portion of any of said design elements in each of said shapes;

determining, by said computer, for each of said shapes of each one of said uniform tessellated grids for each of said BEOL layers, an equivalent spring constant related to a first spring constant based on said metal area, a first elastic modulus of said metal, and a metal thickness from said design data, and a second spring constant based on said dielectric area, a second elastic modulus of said dielectric, and a dielectric thickness from said design data;

accumulating, by said computer, each equivalent spring constant from each of said shapes of each of said uniform tessellated grids for each of said BEOL layers of said IC chip that is located beneath said each connector, to provide a combined spring constant for each of said shapes of a topmost uniform tessellated grid located beneath said each connector; and mapping, by said computer, each of said combined spring constants from each of said shapes of said topmost uniform tessellated grid located beneath said each connector to provide said elastic modulus map of said IC chip of said chip/device package, and identifying said each connector located above a shape of said topmost uniform tessellated grid that exceeds a threshold combined spring constant in said elastic modulus map with a probable failure site of said chip/device package in said design data; and for at least one shape of said topmost uniform tessellated grid that exceeds said threshold combined spring constant in said elastic modulus map, modifying a metal area of a design element from at least one of said shapes in at least one of said plurality of uniform tessellated grids for each of said BEOL layers of said IC chip, which underlies said at least one shape of said topmost uniform tessellated grid, to decrease a value of said combined spring constant for said at least one shape in said elastic modulus map and reduce an elastic modulus value for said at least one shape.

19. The method of claim 18, each of said shapes of each of said uniform tessellated grids comprising one of squares, rectangles, triangles, and hexagons.

20. The method of claim 18, each shape of said topmost uniform tessellated grid being congruent with a whole number of shapes of a deeper uniform tessellated grid of a deeper BEOL layer having decreased feature sizes of said design elements relative to said feature sizes of said design elements of said topmost uniform tessellated grid of said topmost BEOL layer.

21. The method of claim 18, further comprising:

selecting, by said computer, a local grid area of said topmost uniform tessellated grid centered on said each connector, assigning a local density score to said each connector based on a number of connectors in said local grid area, and identifying said each connector with a local density score of less than a threshold local density score with a probable failure site of said chip/device package in said design data; and selecting, by said computer, a global grid area of said topmost uniform tessellated grid centered on said each connector, said global grid area being greater than said local grid area, assigning a global density score to said each connector based on a number of connectors in said global grid area, and identifying said each connector with a global density score of less than a threshold global density score with a probable failure site of said chip/device package in said design data.

22. The method of claim 21, further comprising determining, by said computer, gradients of said combined spring constants between each of said shapes and adjacent shapes for of each of said uniform tessellated grids for each of said BEOL layers located beneath said each connector, assigning a maximal gradient score based on an absolute difference between each of said shapes and said adjacent shapes, and identifying said each connector that exceeds a threshold maximal gradient score with a probable failure site of said chip/device package in said design data.

23. The method of claim 22, further comprising determining, by said computer, a cumulative score based on said location score, said local density score, said global density score, and said combined spring constant for each of said shapes of each one of said uniform tessellated grids for each of said BEOL layers that is located beneath said each connector, and identifying said each connector that exceeds a threshold cumulative score with a probable failure site of said chip/device package in said design data.

\* \* \* \* \*